(12) United States Patent
Lin et al.

(10) Patent No.: US 10,197,761 B2
(45) Date of Patent: **\*Feb. 5, 2019**

(54) ANNULAR OPTICAL SPACER, IMAGING LENS MODULE, IMAGING APPARATUS AND ELECTRONIC DEVICE

(71) Applicant: LARGAN PRECISION CO., LTD., Taichung (TW)

(72) Inventors: Cheng-Feng Lin, Taichung (TW); Wei-Che Tung, Taichung (TW); Ming-Ta Chou, Taichung (TW)

(73) Assignee: LARGAN PRECISION CO., LTD., Taichung (TW)

( \* ) Notice: Subject to any disclaimer, the term of this patent is extended or adjusted under 35 U.S.C. 154(b) by 3 days.

This patent is subject to a terminal disclaimer.

(21) Appl. No.: 15/823,405

(22) Filed: Nov. 27, 2017

(65) Prior Publication Data

US 2018/0081144 A1     Mar. 22, 2018

Related U.S. Application Data

(63) Continuation of application No. 14/802,150, filed on Jul. 17, 2015, now Pat. No. 9,864,160.

(30) Foreign Application Priority Data

May 27, 2015   (TW) ................................. 104208271

(51) Int. Cl.
*G02B 9/00* (2006.01)
*G02B 9/08* (2006.01)
(Continued)

(52) U.S. Cl.
CPC ............. *G02B 7/026* (2013.01); *G02B 7/021* (2013.01); *G02B 27/0018* (2013.01); *G02B 13/001* (2013.01)

(58) Field of Classification Search
CPC .... G02B 7/026; G02B 27/0018; G02B 7/021; G02B 13/001; G02B 5/005; G02B 27/58; G02B 27/0075; G03F 7/70091
See application file for complete search history.

(56) References Cited

U.S. PATENT DOCUMENTS 6,011,661 A   1/2000   Weng
6,650,486 B2  11/2003  Chen
(Continued)

FOREIGN PATENT DOCUMENTS

CN          203881963 U   10/2014

*Primary Examiner* — Alicia M Harrington
(74) *Attorney, Agent, or Firm* — McClure, Qualey & Rodack, LLP

(57) ABSTRACT

An annular optical spacer includes a first side portion, a second side portion, an outer annular portion and an inner annular portion. The second side portion is disposed opposite to the first side portion. The outer annular portion connects the first side portion and the second side portion. The inner annular portion connects the first side portion and the second side portion, wherein the inner annular portion is closer to a central axis of the annular optical spacer than the outer annular portion. The inner annular portion includes a plurality of annular grooves, wherein the annular grooves are disposed coaxially to the central axis, and each of the annular grooves includes a plurality of stepped surfaces.

16 Claims, 25 Drawing Sheets

(51) Int. Cl.
G02B 7/02 (2006.01)
G02B 27/00 (2006.01)
G02B 13/00 (2006.01)

(56) References Cited

U.S. PATENT DOCUMENTS

| | | |
|---|---|---|
| 6,898,030 B1 | 5/2005 | Lin et al. |
| 7,293,886 B2 | 11/2007 | Holmgren et al. |
| 7,787,184 B2 | 8/2010 | Yoshikawa et al. |
| 2011/0109969 A1* | 5/2011 | Ogasawara ............ G02B 7/021 359/601 |
| 2015/0253532 A1 | 9/2015 | Lin |

* cited by examiner

ANNULAR OPTICAL SPACER, IMAGING LENS MODULE, IMAGING APPARATUS AND ELECTRONIC DEVICE

RELATED APPLICATIONS

The present application is a continuation of the application Ser. No. 14/802,150, filed Jul. 17, 2015, now U.S. Pat. No. 9,864,160, which claims priority to Taiwan Application Serial Number 104208271, filed May 27, 2015, which is herein incorporated by reference.

BACKGROUND

Technical Field

The present disclosure relates to an annular optical spacer and an imaging lens module. More particularly, the present disclosure relates to an annular optical spacer and an imaging lens module which is applicable to portable electronic devices.

Description of Related Art

Due to the popularity of personal electronic products and mobile communication products having camera functionalities, such as smart phones and tablet personal computers, the demand for compact imaging lens modules has been increasing, and the requirements for high resolution and image quality of present compact imaging lens modules increase significantly.

An optical spacer is generally used to provide an optical space between any two lens elements in an imaging lens module. A surface property of the optical spacer relates to an effect of suppressing unexpected lights. Accordingly, an image quality of the imaging lens module is influenced by the surface property of the optical spacer.

A conventional optical spacer is typically manufactured by an injection molding method. The optical spacer has a smooth and bright surface, which is featured with high reflectivity. As a result, the conventional optical spacer cannot suppress unexpected lights.

Another conventional optical spacer is provided for suppressing unexpected lights. The conventional optical spacer is atomized with a surface treatment, so that a reflectivity thereof is reduced. However, the effect of suppressing unexpected lights is still limited. Therefore, the conventional optical spacer cannot satisfy the requirements of high-end optical systems with camera functionalities.

Given the above, how to improve the surface property of the optical spacer for enhancing the image quality of compact imaging lens modules has become one of the important subjects.

SUMMARY

According to one aspect of the present disclosure, an annular optical spacer includes a first side portion, a second side portion, an outer annular portion and an inner annular portion. The second side portion is disposed opposite to the first side portion. The outer annular portion connects the first side portion and the second side portion. The inner annular portion connects the first side portion and the second side portion, wherein the inner annular portion is closer to a central axis of the annular optical spacer than the outer annular portion. The inner annular portion includes a plurality of annular grooves, wherein the annular grooves are disposed coaxially to the central axis, and each of the annular grooves includes a plurality of stepped surfaces.

According to another aspect of the present disclosure, an imaging lens module includes a barrel, a lens assembly, and an annular optical spacer. The lens assembly includes a plurality of lens elements disposed in the barrel. The annular optical spacer disposed in the barrel and connects to at least one of the lens elements. The annular optical spacer includes a first side portion, a second side portion, an outer annular portion, and an inner annular portion. The second side portion is disposed opposite to the first side portion. The outer annular portion connects the first side portion and the second side portion. The inner annular portion connects the first side portion and the second side portion, wherein the inner annular portion is closer to a central axis of the annular optical spacer than the outer annular portion. The inner annular portion includes a plurality of annular grooves, wherein the annular grooves are disposed coaxially to the central axis, and each of the annular grooves includes a plurality of stepped surfaces.

According to another aspect of the present disclosure, an imaging apparatus includes the imaging lens module according to the foregoing aspect.

According to another aspect of the present disclosure, an electronic device includes the imaging apparatus according to the foregoing aspect.

BRIEF DESCRIPTION OF THE DRAWINGS

FIG. 10 shows an imaging lens module according to the 10th embodiment of the present disclosure;

DETAILED DESCRIPTION

1st Embodiment

Figure 1A:
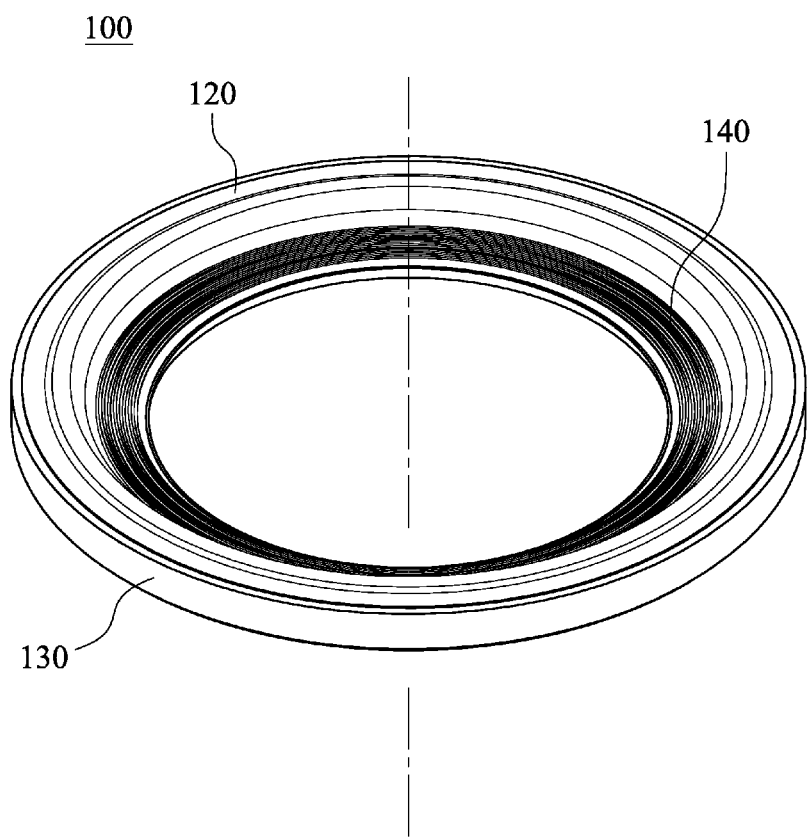
FIG. 1A is a schematic view of an annular optical spacer according to the 1st embodiment of the present disclosure.
Figure 1B:
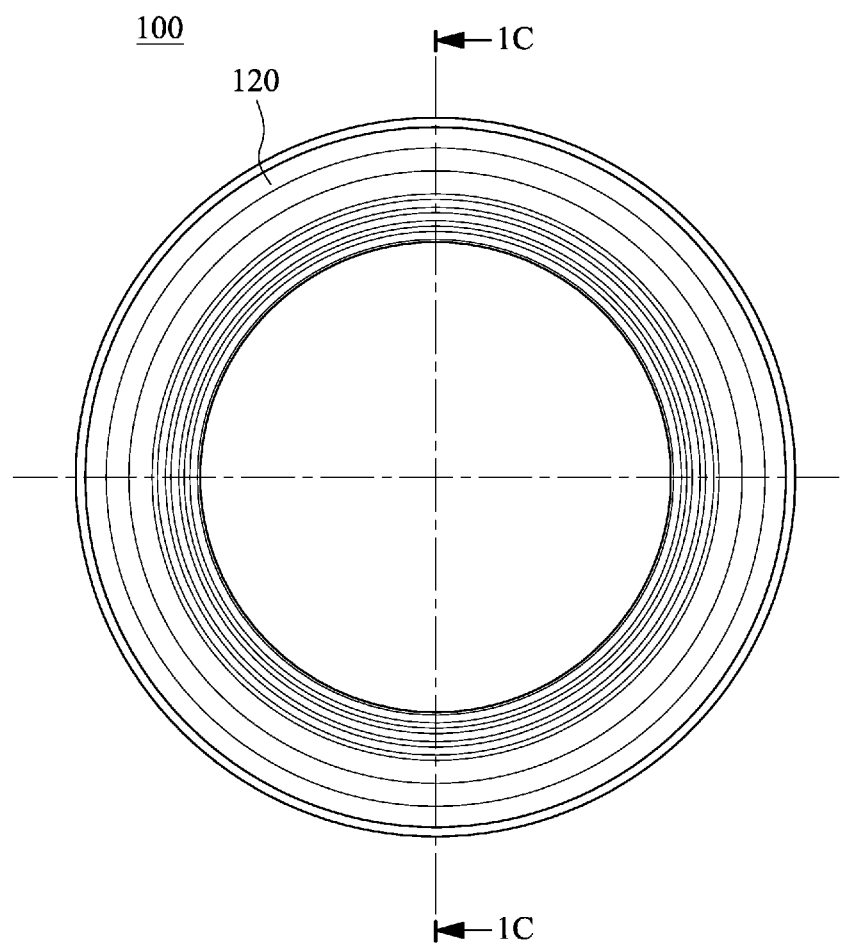
FIG. 1B shows a top view of the annular optical spacer in FIG. 1A.
Figure 1C:
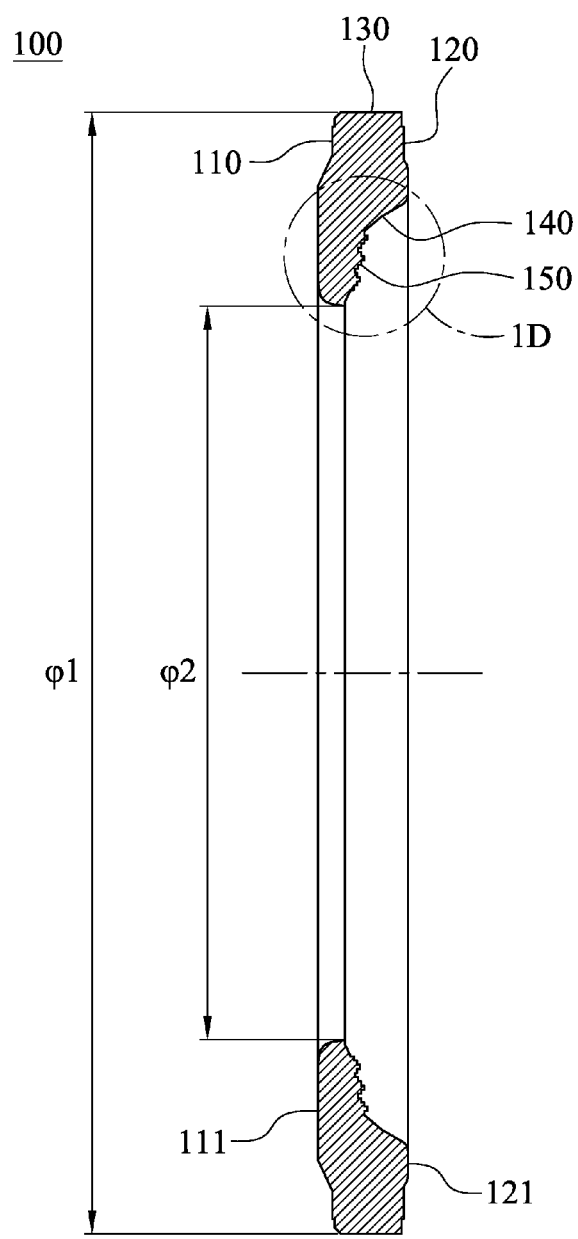
FIG. 1D is an enlarged view of part 1D in FIG. 10 which shows the parameters D, h and d according to the 1st embodiment.
FIG. 1E shows a schematic view of the parameter θ according to the 1st embodiment.
Figure 10:
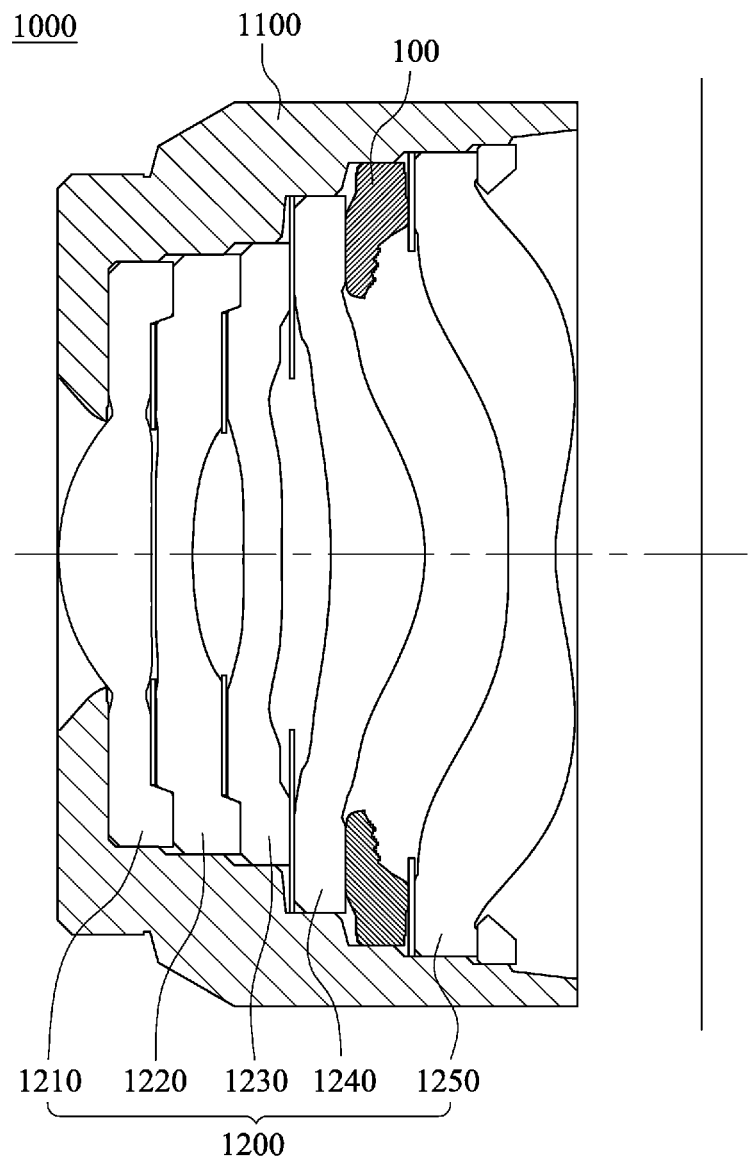
FIG. 10 is a sectional view of the annular optical spacer along line 1C-1C in FIG. 1 which shows the parameters φ1 and φ2 according to the 1st embodiment.

FIG. 1A is a schematic view of an annular optical spacer 100 according to the 1st embodiment of the present disclosure. FIG. 1B shows a top view of the annular optical spacer 100 in FIG. 1A. FIG. 10 is a sectional view of the annular optical spacer 100 along line 10-10 in FIG. 1 which shows the parameters φ1 and φ2 according to the 1st embodiment. In the 1st embodiment, the annular optical spacer 100 includes a first side portion 110, a second side portion 120, an outer annular portion 130 and an inner annular is portion 140.

The second side portion 120 is disposed opposite to the first side portion 110. The outer annular portion 130 connects the first side portion 110 and the second side portion 120. The inner annular portion 140 connects the first side portion 110 and the second side portion 120, wherein the inner annular portion 140 is closer to a central axis of the annular optical spacer 100 than the outer annular portion 130. The inner annular portion 140 includes a plurality of annular grooves 150, wherein the annular grooves 150 are disposed coaxially to the central axis, and each of the annular grooves 150 includes a plurality of stepped surfaces (its reference numeral is omitted). Therefore, it is favorable for reducing the reflected lights effectively so as to improve the image quality.

In details, the annular optical spacer 100 can be made of black plastic material and manufactured by an injection molding method. Therefore, it is favorable for the annular optical spacer 100 applied to the compact lenses.

The annular grooves 150 and the annular optical spacer 100 can be formed integrally. Therefore, it is favorable for maintaining the conveniences of manufacturing so as to be suitable for the mass production.

The first side portion 110 and the second side portion 120 can include an abutting surface 111 and an abutting surface 121 respectively, and the abutting surfaces 111, 121 are both flat and orthogonal to the central axis of the annular optical spacer 100. Therefore, when the annular optical spacer 100 is applied to the imaging lens modules, it is favorable for keeping stable abutting strength among the optical spacers of the imaging lens modules so as to maintain the is image quality of the imaging lens modules.

In the 1st embodiment, when an outer diameter of the annular optical spacer 100 is φ1, and an inner diameter of the annular optical spacer 100 is φ2, the following condition can be satisfied: $0.40 < \varphi 2/\varphi 1 < 0.90$. Therefore, it is favorable for the annular optical spacer 100 applied to the compact lenses.

Figure 1D:
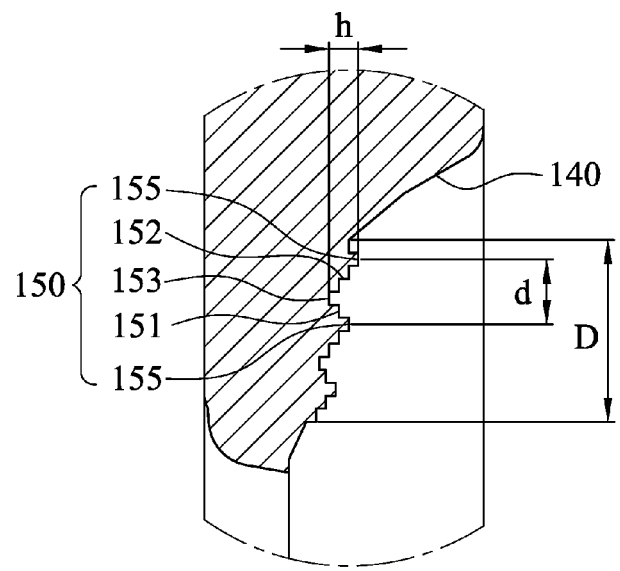

FIG. 1D is an enlarged view of part 1D in FIG. 10 which shows the parameters D, h and d according to the 1st embodiment. In the 1st embodiment, the inner annular portion 140 includes the annular grooves 150, wherein the annular grooves 150 are disposed coaxially to the central axis, and each of the annular grooves 150 includes the stepped surfaces. When a distance between an end closest to the central axis and an end farthest away from the central axis of the annular grooves 150 is D, an outer diameter of the annular optical spacer 100 is φ1, and an inner diameter of the annular optical spacer 100 is φ2, the following condition can be satisfied: $0.15 < 2D/(\varphi 1 - \varphi 2) < 0.80$. Therefore, it is favorable for improving the design conveniences of the annular optical spacer 100 so as to reduce the design difficulties.

In the 1st embodiment, when a number of the annular grooves 150 is N1, the following condition can be satisfied: $2 \leq N1 \leq 50$. Therefore, it is favorable for maintaining the effects of reducing the reflected lights of the stepped surfaces of the annular grooves 150. Preferably, the following condition can be satisfied: $2 \leq N1 \leq 10$.

In the 1st embodiment, the stepped surfaces of each of the annular grooves 150 include a plurality of orthogonal stepped surfaces 151 and a plurality of parallel stepped surfaces 152, wherein the orthogonal stepped surfaces 151 are orthogonal to the central axis and the parallel stepped surfaces 152 are parallel to the central axis. One of the orthogonal stepped surfaces is a groove bottom 153, and each of other two of the orthogonal stepped surfaces is a groove end 155. A distance parallel to the central axis between the groove bottom 153 and the first side portion 110 is smallest among distances parallel to the central axis between the orthogonal stepped surfaces 151 and the first side portion 110. The two groove ends 155 are disposed on two ends of the annular grooves 150 respectively, and a distance parallel to the central axis between each of the two groove ends 155 and the first side portion 110 is greater than distances parallel to the central axis between the orthogonal stepped surfaces 151 adjacent to thereof and the first side portion 110. That is, the distance parallel to the central axis between each of the two groove ends 155 and the first side portion 110 is greater than distances parallel to the central axis between the orthogonal stepped surfaces 151 adjacent to thereof and the first side portion 110, so each of the two groove ends 155 is the boundary of two annular grooves 150 adjacent to each other. The boundary between two annular grooves 150, which are adjacent to each other, is the same one of the groove ends 155 (the same one of the orthogonal stepped surfaces), wherein the foregoing one of the groove ends 155 is one of the orthogonal stepped surfaces included in two annular grooves 150 which are adjacent to each other. When a number of the orthogonal stepped surfaces 151 of at least one of the annular grooves 150 is N2, the following condition can be satisfied: $4 \leq N2 \leq 14$. Therefore, it is favorable for maintaining the effects of reducing the reflected lights of the stepped surfaces of the annular grooves 150. Preferably, the following condition can be satisfied: $5 \leq N2 \leq 8$.

Furthermore, when a sum of the orthogonal stepped surfaces 151 of is each of the annular grooves 150 is $\Sigma N2$, the following condition can be satisfied: $8 \leq \Sigma N2$. Therefore, it is favorable for maintaining the effects of reducing the reflected lights of the stepped surfaces of the annular grooves 150.

In the 1st embodiment, when the distance parallel to the central axis of each of the annular grooves 150 between one of the two groove ends 155 and the first side portion 110 is greater than the distance parallel to the central axis between the other one of the two groove ends 155 and the first side portion 110, and a distance parallel to the central axis between the one of the two groove ends 155 and the groove bottom 153 is h, the following condition can be satisfied: 0.02 mm<h<0.15 mm. Therefore, it is favorable for obtaining a significant surface structure of the annular grooves 150 so as to reduce the reflected lights and improve the image quality.

In the 1st embodiment, when the distance parallel to the central axis of each of the annular grooves 150 between one of the two groove ends 155 and the first side portion 110 is greater than the distance parallel to the central axis between the other one of the two groove ends 155 and the first side portion 110, a distance parallel to the central axis between the one of the two groove ends 155 and the groove bottom 153 is h, and a distance orthogonal to the central axis between the two groove ends 155 is d, the following condition can be to satisfied: 0.15<h/d<1.6. Therefore, it is favorable for obtaining a proper proportion of the stepped surfaces of the annular grooves 150 so as to reduce the strength of the reflected lights of the annular grooves 150.

Figure 1E:
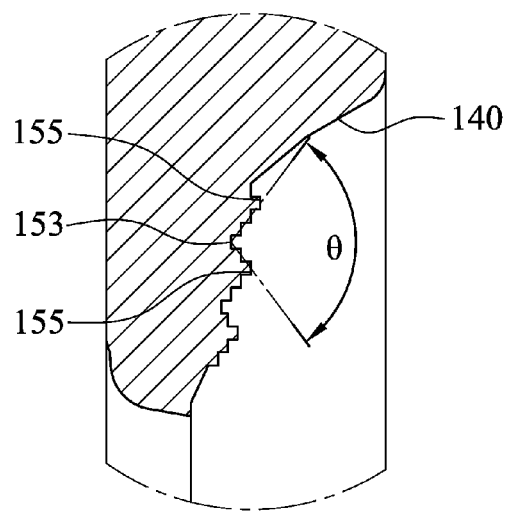

FIG. 1E shows a schematic view of the parameter θ according to the 1st embodiment. In the 1st embodiment, when an angle between two lines is connecting the groove bottom 153 and the two groove ends 155 respectively is θ, the following condition can be satisfied: 45 degrees<θ<125 degrees. Therefore, it is favorable for the manufacturing yield rate of the annular optical spacer 100 and reducing the manufacturing difficulties.

The data of the aforementioned parameters of the annular optical spacer 100 according to the 1st embodiment of the present disclosure are listed in the following Table 1. In Table 1, the sum of the orthogonal stepped surfaces 151 of each of the annular grooves 150 of the annular optical spacer 100 is $\Sigma N2$. Followed by showing the main ones of the annular grooves 150 of the annular optical spacer 100, a number of the annular grooves 150 which have the numbers of the orthogonal stepped surfaces 151 equaling to 4 to 14 respectively is N1, the number of the orthogonal stepped surfaces 151 of the annular grooves 150 aforementioned is N2, and the parameters h, d, h/d and θ are listed in Table 1 and shown as FIG. 1D and FIG. 1E.

TABLE 1

| 1st Embodiment | | | |
|---|---|---|---|
| φ1(mm) | 5.35 | N1 | 2 |
| φ2(mm) | 3.50 | N2 | 6 |
| φ2/φ1 | 0.65 | h (mm) | 0.045 |
| φ1-φ2 | 1.85 | d (mm) | 0.100 |
| D (mm) | 0.28 | h/d | 0.45 |
| 2D/(φ1-φ2) | 0.30 | θ (degrees) | 106.0 |
| ΣN2 | >10 | | |

2nd Embodiment

Figure 2A:
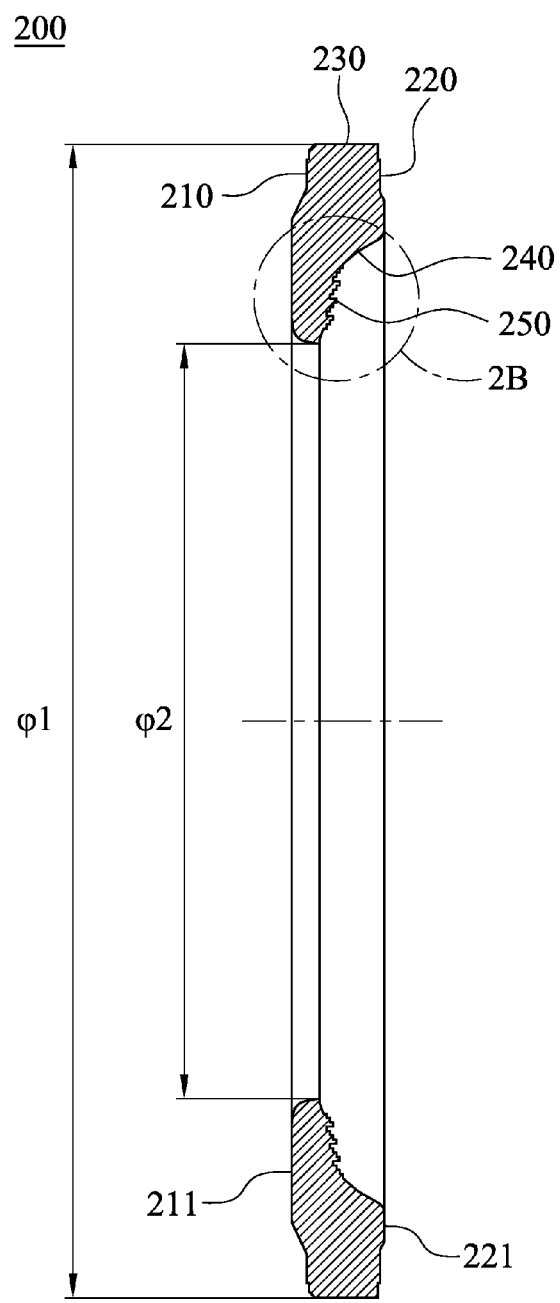
FIG. 2A is a schematic view of an annular optical spacer and the parameters φ1 and φ2 according to the 2nd embodiment of the present disclosure.

FIG. 2A is a schematic view of an annular optical spacer 200 and the parameters φ1 and φ2 according to the 2nd embodiment of the present disclosure. In the 2nd embodiment, the annular optical spacer 200 includes a first side portion 210, a second side portion 220, an outer annular portion 230 to and an inner annular portion 240.

The second side portion 220 is disposed opposite to the first side portion 210. The first side portion 210 and the second side portion 220 include an abutting surface 211 and an abutting surface 221 respectively, and the abutting surfaces 211, 221 are both flat and orthogonal to a central axis of the annular optical spacer 200. The outer annular portion 230 connects the first side portion 210 and the second side portion 220. The inner annular portion 240 connects the first side portion 210 and the second side portion 220, wherein the inner annular portion 240 is closer to the central axis of the annular optical spacer 200 than the outer annular portion 230. The inner annular portion 240 includes a plurality of annular grooves 250, wherein the annular grooves 250 are disposed coaxially to the central axis, and each of the annular grooves 250 includes a plurality of stepped surfaces (its reference numeral is omitted).

The annular optical spacer 200 is made of black plastic material and manufactured by an injection molding method. The annular grooves 250 and the annular optical spacer 200 are formed integrally.

Figure 2B:
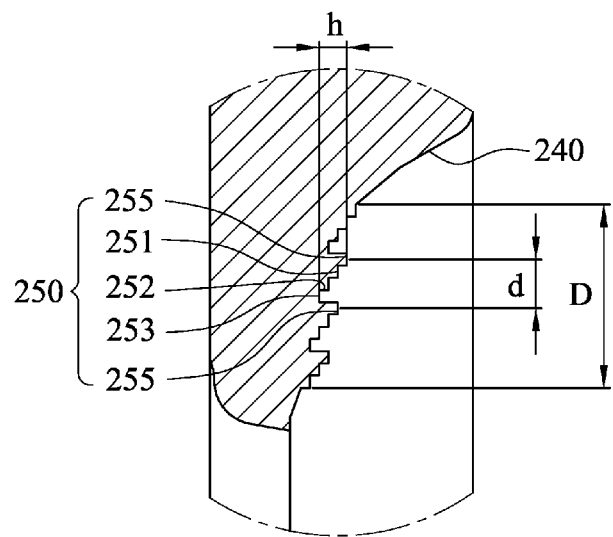
FIG. 2B is an enlarged view of part 2B in FIG. 2A which shows the parameters D, h and d according to the 2nd embodiment.
Figure 2C:
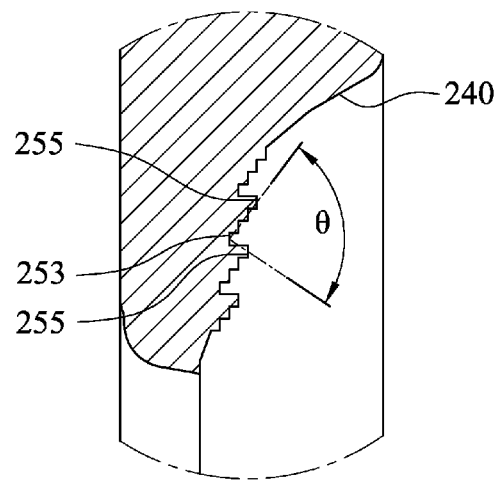
FIG. 2C shows a schematic view of the parameter θ according to the 2nd embodiment.

FIG. 2B is an enlarged view of part 2B in FIG. 2A which shows the parameters D, h and d according to the 2nd embodiment. FIG. 2C shows a schematic view of the parameter θ according to the 2nd embodiment. In the 2nd embodiment, the stepped surfaces of each of the annular grooves 250 include a plurality of orthogonal stepped surfaces 251 and a plurality of parallel stepped surfaces 252, wherein the orthogonal stepped surfaces 251 are orthogonal to the central axis and the parallel stepped surfaces 252 are parallel to the central axis. One of the orthogonal stepped surfaces 251 is a groove bottom 253, and each of another two of the orthogonal stepped surfaces 251 is a groove end 255. A distance parallel to the central axis between the groove bottom 253 and the first side portion 210 is smallest among distances parallel to the central axis between the orthogonal stepped surfaces 251 and the first side portion 210. The two groove ends 255 are disposed on two ends of the annular grooves 250 respectively.

The data of the parameters φ1, φ2, φ241, φ1−φ2, D, 2D/(φ1−φ2), ΣN2, N1, N2, h, d, h/d and θ of the annular optical spacer 200 according to the 2nd embodiment of the present disclosure are listed in the following Table 2. The definitions of these parameters shown in Table 2 are the same as those stated in the 1st embodiment with corresponding values for the 2nd embodiment. In Table 2, the sum of the orthogonal stepped surfaces 251 of each of the annular grooves 250 of the annular optical spacer 200 is ΣN2. Followed by showing the main ones of the annular grooves 250 of the annular optical spacer 200, a number of the annular grooves 250 which have the numbers of the orthogonal stepped surfaces 251 equaling to 4 to 14 respectively is N1, the number of the orthogonal stepped surfaces 251 of the annular grooves 250 aforementioned is N2, and the parameters h, d, h/d and θ are listed in Table 2 and shown as FIG. 2B and FIG. 2C.

TABLE 2

2nd Embodiment

| | | | |
|---|---|---|---|
| φ1(mm) | 5.35 | N1 | 3 |
| φ2(mm) | 3.50 | N2 | 5 |
| φ2/φ1 | 0.65 | h (mm) | 0.045 |
| φ1−φ2 | 1.85 | d (mm) | 0.080 |
| D (mm) | 0.30 | h/d | 0.56 |
| 2D/(φ1−φ2) | 0.32 | θ (degrees) | 87.0 |
| ΣN2 | >10 | | |

3rd Embodiment

Figure 3A:
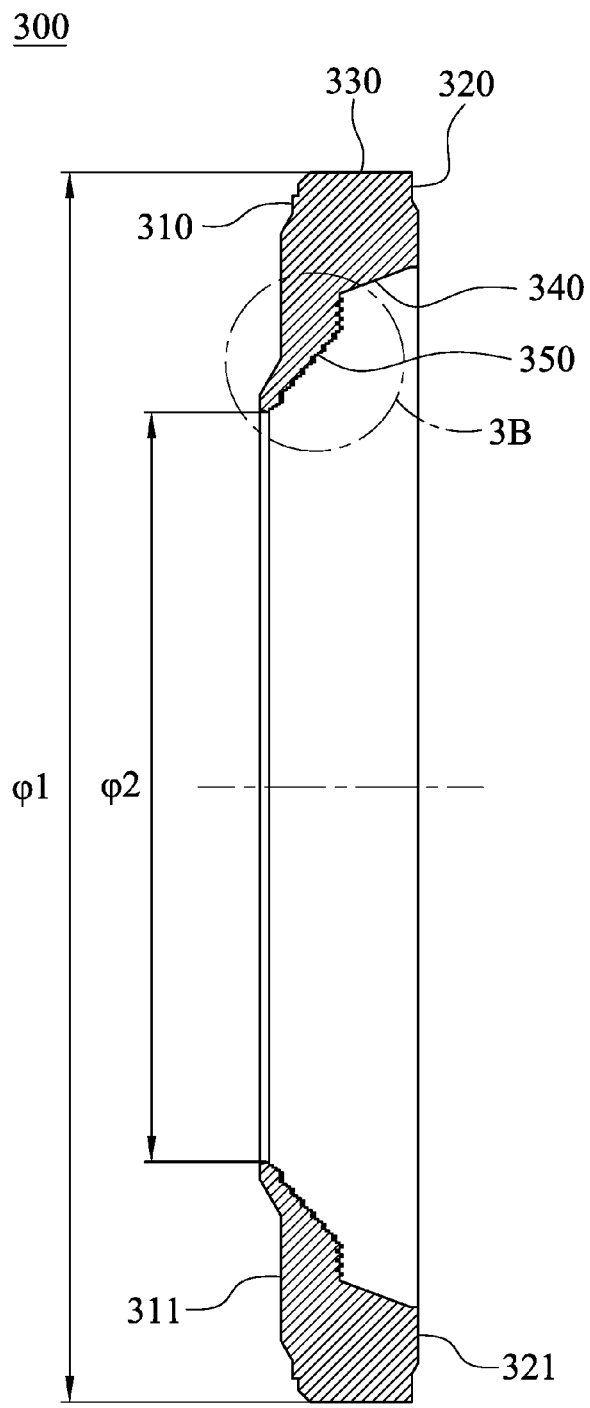
FIG. 3A is a schematic view of an annular optical spacer and the parameters φ1 and φ2 according to the 3rd embodiment of the present disclosure.

FIG. 3A is a schematic view of an annular optical spacer 300 and the parameters φ1 and φ2 according to the 3rd embodiment of the present disclosure. In the 3rd embodiment, the annular optical spacer 300 includes a first side portion 310, a second side portion 320, an outer annular portion 330 and an inner annular portion 340.

The second side portion 320 is disposed opposite to the first side portion 310. The first side portion 310 and the second side portion 320 include an abutting surface 311 and an abutting surface 321 respectively, and the abutting surface 311, 321 are both flat and orthogonal to a central axis of the annular optical spacer 300. The outer annular portion 330 connects the first side portion 310 and the second side portion 320. The inner annular portion 340 connects the first side portion 310 and the second side portion 320, wherein the inner annular portion 340 is closer to the central axis of the annular optical spacer 300 than the outer annular portion 330. The inner annular portion 340 includes a plurality of annular grooves 350, wherein the annular grooves 350 are disposed coaxially to the central axis, and each of the annular grooves 350 includes a plurality of stepped surfaces (its reference numeral is omitted).

The annular optical spacer 300 is made of black plastic material and to manufactured by an injection molding method. The annular grooves 350 and the annular optical spacer 300 are formed integrally.

Figure 3B:
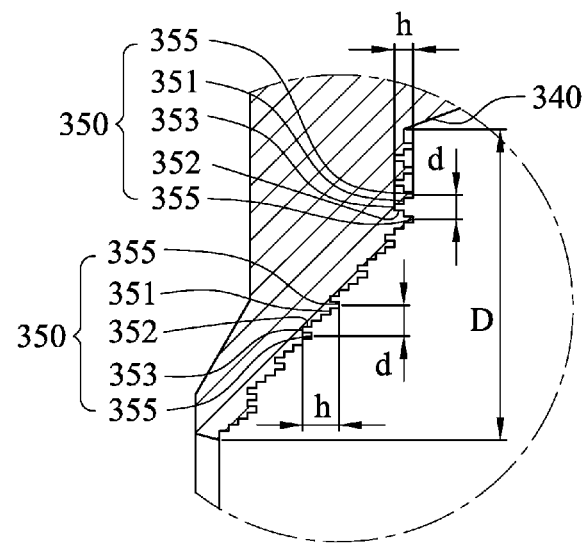
FIG. 3B is an enlarged view of part 3B in FIG. 3A which shows the parameters D, h and d according to the 3rd embodiment.
Figure 3C:
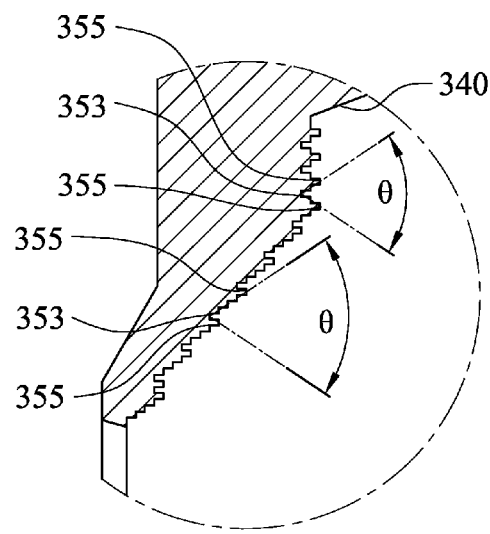
FIG. 3C shows a schematic view of the parameter θ according to the 3rd embodiment.

FIG. 3B is an enlarged view of part 3B in FIG. 3A which shows the parameters D, h and d according to the 3rd embodiment. FIG. 3C shows a schematic view of the parameter θ according to the 3rd embodiment. In the 3rd embodiment, the stepped surfaces of each of the annular grooves 350 include a plurality of orthogonal stepped surfaces 351 and a plurality of parallel stepped surfaces 352, wherein the orthogonal stepped surfaces 351 are orthogonal to the central axis and the parallel stepped surfaces 352 are parallel to the central axis. One of the orthogonal stepped surfaces 351 is a groove bottom 353, and each of another two of the orthogonal stepped surfaces 351 is a groove end 355. A distance parallel to the central axis between the groove bottom 353 and the first side portion 310 is smallest among distances parallel to the central axis between the orthogonal stepped surfaces 351 and the first side portion 310. The two groove ends 355 are disposed on two ends of the annular grooves 350 respectively.

The data of the parameters φ1, φ2, φ2/φ1, φ1−φ2, D, 2D/(φ1−φ2), ΣN2, N1, N2, h, d, h/d and θ of the annular optical spacer 300 according to the 3rd embodiment of the present disclosure are listed in the following Table 3. The definitions of these parameters shown in Table 3 are the same as those stated in the 1st embodiment with corresponding values for the 3rd embodiment. In Table 3, the sum of the orthogonal stepped surfaces 351 of each of the annular grooves 350 of the annular optical spacer 300 is ΣN2. Followed by showing the main ones of the annular grooves 350 of the annular optical spacer 300, a number of the annular grooves 350 which have the numbers of the orthogonal to stepped surfaces 351 equaling to 4 to 14 respectively is N1, the number of the orthogonal stepped surfaces 351 of the annular grooves 350 aforementioned is N2, the number of the annular grooves 350 (N1) which have the numbers of the orthogonal stepped surfaces 351 (N2) equaling to 6 respectively is 5, the number of the annular grooves 350 (N1) which have the numbers of the orthogonal stepped surfaces 351 (N2) equaling to 5 respectively is 3, and the corresponding parameters h, d, h/d and θ are listed in Table 3 and shown as FIG. 3B and FIG. 3C.

TABLE 3

3rd Embodiment

| | | | | |
|---|---|---|---|---|
| φ1(mm) | 5.25 | N1 | | 8 |
| φ2(mm) | 3.20 | N2 | 6 | 5 |
| φ2/φ1 | 0.61 | h (mm) | 0.060 | 0.030 |
| φ1−φ2 | 2.05 | d (mm) | 0.050 | 0.040 |
| D (mm) | 0.51 | h/d | 1.20 | 0.75 |
| 2D/(φ1−φ2) | 0.49 | θ (degrees) | 67.0 | 67.0 |
| ΣN2 | >20 | | | |

4th Embodiment

Figure 4A:
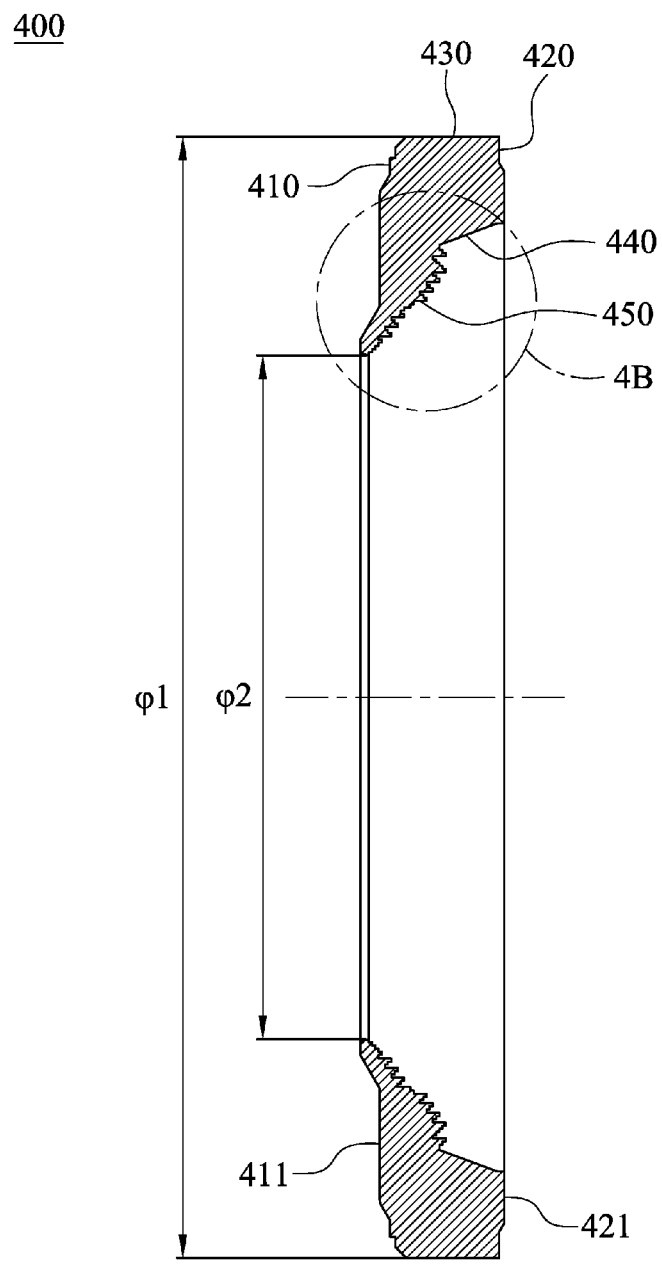
FIG. 4A is a schematic view of an annular optical spacer and the parameters φ1 and φ2 according to the 4th embodiment of the present disclosure.

FIG. 4A is a schematic view of an annular optical spacer 400 and the parameters φ1 and φ2 according to the 4th embodiment of the present disclosure. In the 4th embodiment, the annular optical spacer 400 includes a first side portion 410, a second side portion 420, an outer annular portion 430 and an inner annular portion 440.

The second side portion 420 is disposed opposite to the first side portion 410. The first side portion 410 and the second side portion 420 include an abutting surface 411 and an abutting surface 421 respectively, and the abutting surface 411, 421 are both flat and orthogonal to a central axis of the annular optical spacer 400. The outer annular portion 430 connects the first side portion 410 and the second side portion 420. The inner annular portion 440 connects the first side portion 410 and the second side portion 420, wherein the inner annular portion 440 is closer to the central axis of the annular optical spacer 400 than the outer annular portion 430. The inner annular portion 440 is includes a plurality of annular grooves 450, wherein the annular grooves 450 are disposed coaxially to the central axis, and each of the annular grooves 450 includes a plurality of stepped surfaces (its reference numeral is omitted).

The annular optical spacer 400 is made of black plastic material and manufactured by an injection molding method. The annular grooves 450 and the annular optical spacer 400 are formed integrally.

Figure 4B:
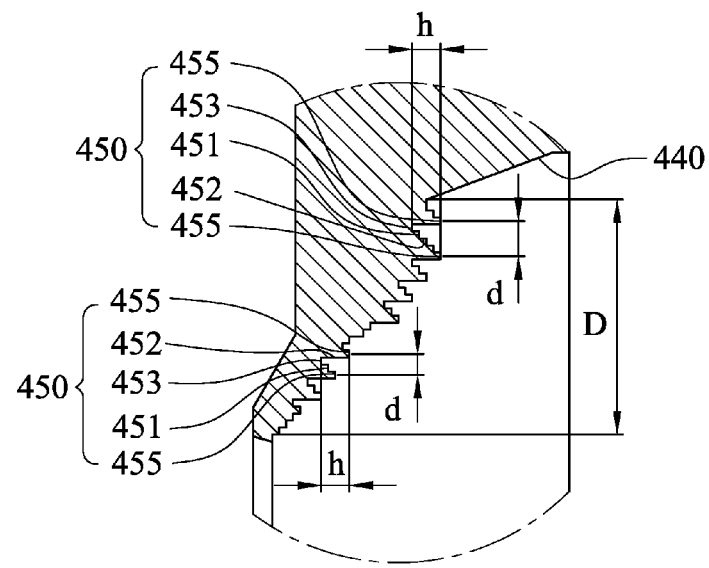
FIG. 4B is an enlarged view of part 4B in FIG. 4A which shows the parameters D, h and d according to the 4th embodiment.
Figure 4C:
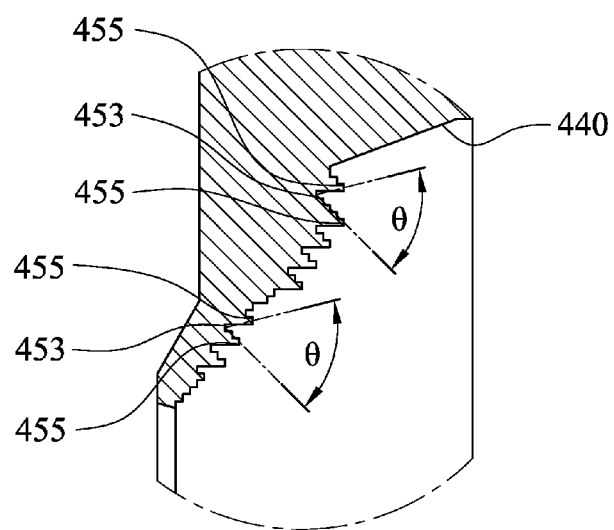
FIG. 4C shows a schematic view of the parameter θ according to the 4th embodiment.

FIG. 4B is an enlarged view of part 4B in FIG. 4A which shows the parameters D, h and d according to the 4th embodiment. FIG. 4C shows a schematic view of the parameter θ according to the 4th embodiment. In the 4th embodiment, the stepped surfaces of each of the annular grooves 450 include a plurality of orthogonal stepped surfaces 451 and a plurality of parallel stepped surfaces 452, wherein the orthogonal stepped surfaces 451 are orthogonal to the central axis and the parallel stepped surfaces 452 are parallel to the central axis. One of the orthogonal stepped surfaces 451 is a groove bottom 453, and each of another two of the orthogonal stepped surfaces 451 is a groove end 455. A distance parallel to the central axis between the groove bottom 453 and the first side portion 410 is smallest among distances parallel to the central axis between the orthogonal stepped surfaces 451 and the first side portion 410. The two groove ends 455 are disposed on two ends of the annular grooves 450 respectively.

The data of the parameters φ1, φ2, φ2/φ1, φ1−φ2, D, 2D/(φ1−φ2), ΣN2, N1, N2, h, d, h/d and θ of the annular optical spacer 400 according to the 4th embodiment of the present disclosure are listed in the following Table 4. The definitions of these parameters shown in Table 4 are the same as those stated in the 1st embodiment with corresponding values for the 4th embodiment. In is Table 4, the sum of the orthogonal stepped surfaces 451 of each of the annular grooves 450 of the annular optical spacer 400 is ΣN2. Followed by showing the main ones of the annular grooves 450 of the annular optical spacer 400, a number of the annular grooves 450 which have the numbers of the orthogonal stepped surfaces 451 equaling to 4 to 14 respectively is N1, the number of the orthogonal stepped surfaces 451 of the annular grooves 450 aforementioned is N2, the number of the annular grooves 450 (N1) which have the numbers of the orthogonal stepped surfaces 451 (N2) equaling to 4 respectively is 5, the number of the annular grooves 450 (N1) which have the numbers of the orthogonal stepped surfaces 451 (N2) equaling to 6 respectively is 1, and the corresponding parameters h, d, h/d and θ are listed in Table 4 and shown as FIG. 4B and FIG. 4C.

TABLE 4

4th Embodiment

| φ1(mm) | 5.25 | N1 | | 6 |
|---|---|---|---|---|
| φ2(mm) | 3.20 | N2 | 4 | 6 |
| φ2/φ1 | 0.61 | h (mm) | 0.060 | 0.060 |
| φ1−φ2 | 2.05 | d (mm) | 0.045 | 0.075 |
| D (mm) | 0.50 | h/d | 1.33 | 0.80 |
| 2D/(φ1−φ2) | 0.49 | θ (degrees) | 59.0 | 59.0 |
| ΣN2 | >10 | | | |

5th Embodiment

Figure 5A:
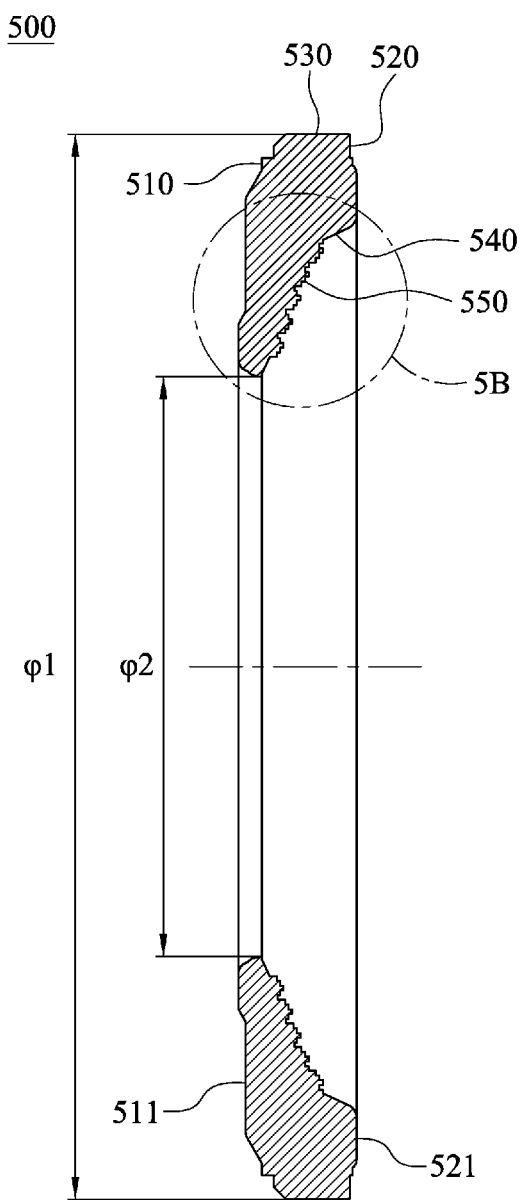
FIG. 5A is a schematic view of an annular optical spacer and the parameters φ1 and φ2 according to the 5th embodiment of the present disclosure.

FIG. 5A is a schematic view of an annular optical spacer 500 and the parameters φ1 and φ2 according to the 5th embodiment of the present disclosure. In the 5th embodiment, the annular optical spacer 500 includes a first side portion 510, a second side portion 520, an outer annular portion 530 and an inner annular portion 540.

The second side portion 520 is disposed opposite to the first side portion 510. The first side portion 510 and the second side portion 520 include an abutting surface 511 and an abutting surface 521 respectively, and the abutting surface 511, 521 are both flat and orthogonal to a central axis of the annular optical spacer 500. The outer annular portion 530 connects the first side is portion 510 and the second side portion 520. The inner annular portion 540 connects the first side portion 510 and the second side portion 520, wherein the inner annular portion 540 is closer to the central axis of the annular optical spacer 500 than the outer annular portion 530. The inner annular portion 540 includes a plurality of annular grooves 550, wherein the annular grooves 550 are disposed coaxially to the central axis, and each of the annular grooves 550 includes a plurality of stepped surfaces (its reference numeral is omitted).

The annular optical spacer 500 is made of black plastic material and manufactured by an injection molding method. The annular grooves 550 and the annular optical spacer 500 are formed integrally.

Figure 5B:
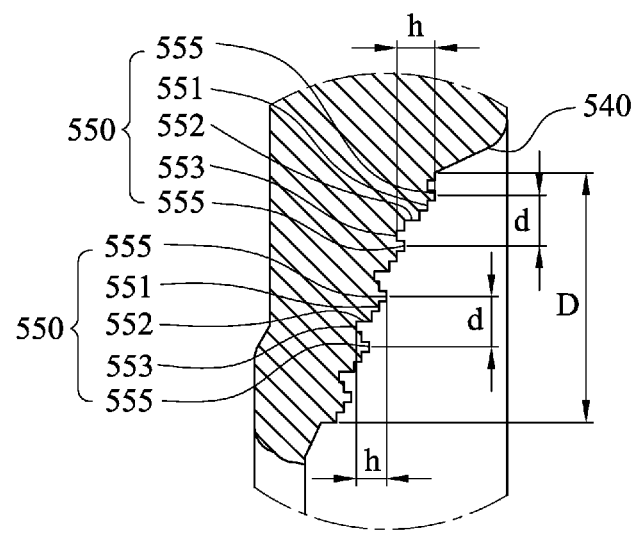
FIG. 5B is an enlarged view of part 5B in FIG. 5A which shows the parameters D, h and d according to the 5th embodiment.
Figure 5C:
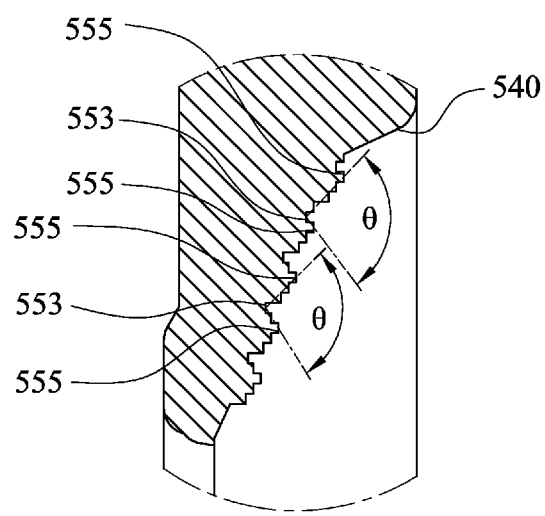
FIG. 5C shows a schematic view of the parameter θ according to the 5th embodiment.

FIG. 5B is an enlarged view of part 5B in FIG. 5A which shows the parameters D, h and d according to the 5th embodiment. FIG. 5C shows a schematic view of the parameter θ according to the 5th embodiment. In the 5th embodiment, the stepped surfaces of each of the annular grooves 550 include a plurality of orthogonal stepped surfaces 551 and a plurality of parallel stepped surfaces 552, wherein the orthogonal stepped surfaces 551 are orthogonal to the central axis and the parallel stepped surfaces 552 are parallel to the central axis. One of the orthogonal stepped surfaces 551 is a groove bottom 553, and each of another two of the orthogonal stepped surfaces 551 is is a groove end 555. A distance parallel to the central axis between the groove bottom 553 and the first side portion 510 is smallest among distances parallel to the central axis between the orthogonal stepped surfaces 551 and the first side portion 510. The two groove ends 555 are disposed on two ends of the annular grooves 550 respectively.

The data of the parameters φ1, φ2, φ2/φ1, φ1−φ2, D, 2D/(φ1−φ2), ΣN2, N1, N2, h, d, h/d and θ of the annular optical spacer 500 according to the 5th embodiment of the present disclosure are listed in the following Table 5. The definitions of these parameters shown in Table 5 are the same as those stated in the 1st embodiment with corresponding values for the 5th embodiment. In Table 5, the sum of the orthogonal stepped surfaces 551 of each of the annular grooves 550 of the annular optical spacer 500 is ΣN2. Followed by showing the main ones of the annular grooves 550 of the annular optical spacer 500, a number of the annular grooves 550 which have the numbers of the orthogonal stepped surfaces 551 equaling to 4 to 14 respectively is N1, the number of the orthogonal stepped surfaces 551 of the annular grooves 550 aforementioned is N2, and the parameters h, d, h/d and θ corresponding to two kinds of the annular grooves 550 are respectively listed in Table 5 and shown as FIG. 5B and FIG. 5C.

TABLE 5

| 5th Embodiment | | | | |
|---|---|---|---|---|
| φ1(mm) | 4.50 | N1 | 4 | |
| φ2(mm) | 2.45 | N2 | 6 | 6 |
| φ2/φ1 | 0.54 | h (mm) | 0.060 | 0.075 |
| φ1-φ2 | 2.05 | d (mm) | 0.100 | 0.100 |
| D (mm) | 0.50 | h/d | 0.60 | 0.75 |
| 2D/(φ1-φ2) | 0.48 | θ (degrees) | 103.0 | 100.0 |
| ΣN2 | >10 | | | |

6th Embodiment

Figure 6A:
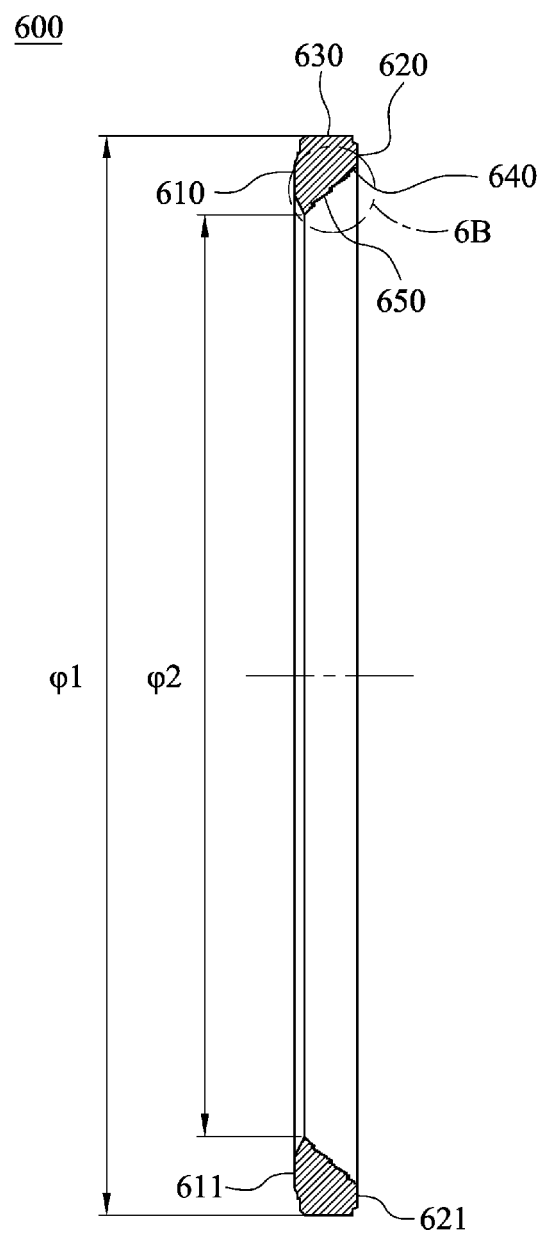
FIG. 6A is a schematic view of an annular optical spacer and the parameters φ1 and φ2 according to the 6th embodiment of the present disclosure.

FIG. 6A is a schematic view of an annular optical spacer 600 and the parameters φ1 and φ2 according to the 6th embodiment of the present disclosure. In the 6th embodiment, the annular optical spacer 600 includes a first side portion 610, a second side portion 620, an outer annular portion 630 and an inner annular portion 640.

The second side portion 620 is disposed opposite to the first side portion 610. The first side portion 610 and the second side portion 620 include an abutting surface 611 and an abutting surface 621 respectively, and the abutting surface 611, 621 are both flat and orthogonal to a central axis of the annular optical spacer 600. The outer annular portion 630 connects the first side portion 610 and the second side portion 620. The inner annular portion 640 connects the first side portion 610 and the second side portion 620, wherein the inner annular portion 640 is closer to the central axis of the annular optical spacer 600 than the outer annular portion 630. The inner annular portion 640 includes a plurality of annular grooves 650, wherein the annular grooves 650 are disposed coaxially to the central axis, and each of the annular grooves 650 includes a plurality of stepped surfaces (its reference numeral is omitted).

The annular optical spacer 600 is made of black plastic material and manufactured by an injection molding method. The annular grooves 650 and the annular optical spacer 600 are formed integrally.

Figure 6B:
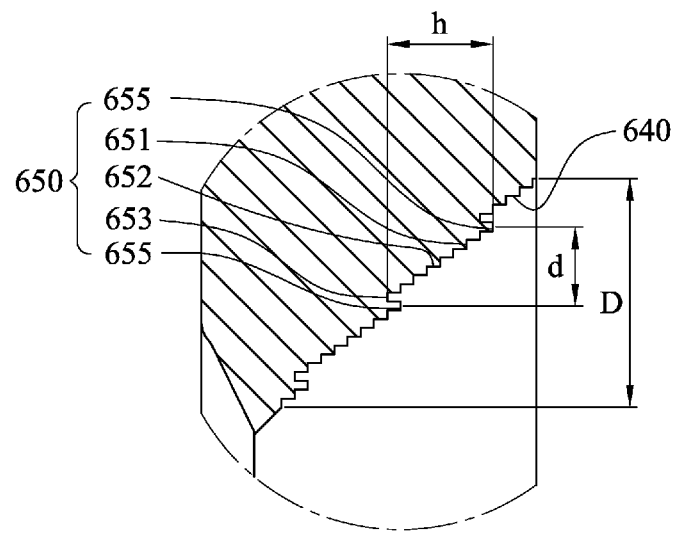
FIG. 6B is an enlarged view of part 6B in FIG. 6A which shows the parameters D, h and d according to the 6th embodiment.
Figure 6C:
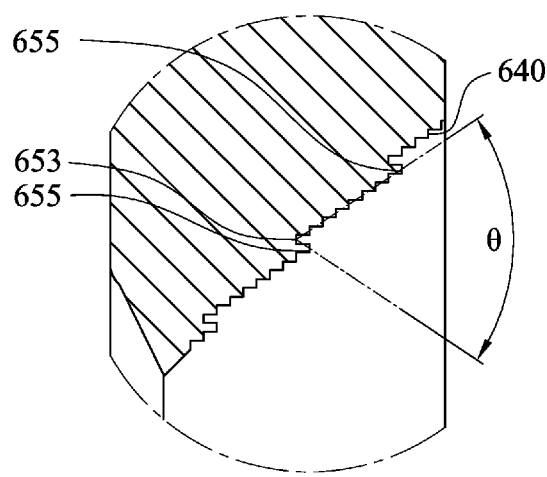
FIG. 6C shows a schematic view of the parameter θ according to the 6th embodiment.

FIG. 6B is an enlarged view of part 6B in FIG. 6A which shows the parameters D, h and d according to the 6th embodiment. FIG. 6C shows a schematic view of the parameter θ according to the 6th embodiment. In the 6th embodiment, the stepped surfaces of each of the annular grooves 650 include a plurality of orthogonal stepped surfaces 651 and a plurality of parallel stepped surfaces 652, wherein the orthogonal stepped surfaces 651 are orthogonal to the central axis and the parallel stepped surfaces 652 are parallel to the central axis. One of the orthogonal stepped surfaces 651 is a groove bottom 653, and each of another two of the orthogonal stepped surfaces 651 is a groove end 655. A distance parallel to the central axis between the groove bottom 653 and the first side portion 610 is smallest among distances parallel to the central axis between the orthogonal stepped surfaces 651 and the first side portion 610. The two groove ends 655 are disposed on two ends of the annular grooves 650 respectively.

The data of the parameters φ1, φ2, φ2/φ1, φ1-φ2, D, 2D/(φ1-φ2), ΣN2, N1, N2, h, d, h/d and θ of the annular optical spacer 600 according to the 6th embodiment of the present disclosure are listed in the following Table 6. The definitions of these parameters shown in Table 6 are the same as those stated in the 1st embodiment with corresponding values for the 6th embodiment. In Table 6, the sum of the orthogonal stepped surfaces 651 of each of the annular grooves 650 of the annular optical spacer 600 is ΣN2. Followed by showing the main ones of the annular grooves 650 of the annular optical spacer 600, a number of the annular grooves 650 which have the numbers of the orthogonal to stepped surfaces 651 equaling to 4 to 14 respectively is N1, the number of the orthogonal stepped surfaces 651 of the annular grooves 650 aforementioned is N2, and the parameters h, d, h/d and θ are listed in Table 6 and shown as FIG. 6B and FIG. 6C.

TABLE 6

| 6th Embodiment | | | |
|---|---|---|---|
| φ1(mm) | 6.50 | N1 | 2 |
| φ2(mm) | 5.55 | N2 | 10 |
| φ2/φ1 | 0.85 | h (mm) | 0.120 |
| φ1-φ2 | 0.95 | d (mm) | 0.090 |
| D (mm) | 0.26 | h/d | 1.33 |
| 2D/(φ1-φ2) | 0.55 | θ (degrees) | 67.0 |
| ΣN2 | >10 | | |

7th Embodiment

Figure 7A:
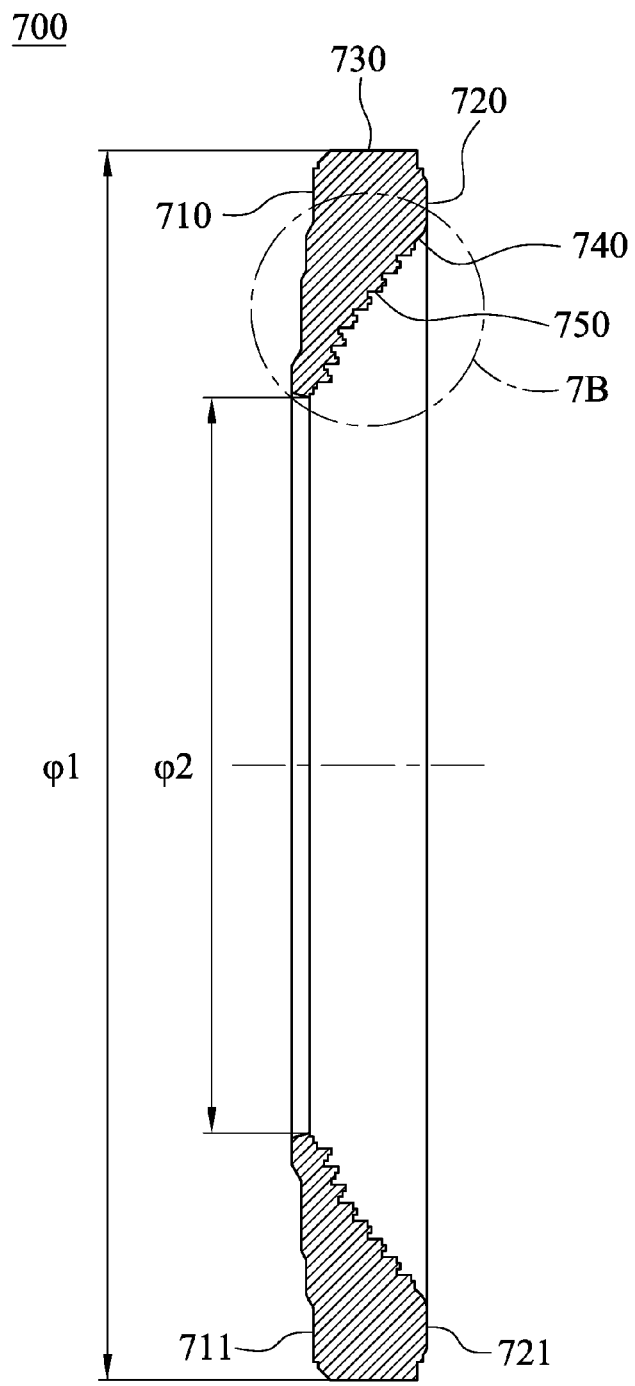
FIG. 7A is a schematic view of an annular optical spacer and the parameters φ1 and φ2 according to the 7th embodiment of the present disclosure.

FIG. 7A is a schematic view of an annular optical spacer 700 and the parameters φ1 and φ2 according to the 7th embodiment of the present disclosure. In the 7th embodiment, the annular optical spacer 700 includes a first side portion 710, a second side portion 720, an outer annular portion 730 and an inner annular portion 740.

The second side portion 720 is disposed opposite to the first side portion 710. The first side portion 710 and the second side portion 720 include an abutting surface 711 and an abutting surface 721 respectively, and the abutting surface 711, 721 are both flat and orthogonal to a central axis of the annular optical spacer 700. The outer annular portion 730 connects the first side portion 710 and the second side portion 720. The inner annular portion 740 connects the first side portion 710 and the second side portion 720, wherein the inner annular portion 740 is closer to the central axis of the annular optical spacer 700 than the outer annular portion 730. The inner annular portion 740 includes a plurality of annular grooves 750, wherein the annular grooves 750 are disposed coaxially to the central axis, and each of the annular grooves 750 includes a plurality of stepped surfaces (its reference numeral is omitted).

The annular optical spacer 700 is made of black plastic material and manufactured by an injection molding method. The annular grooves 750 and the annular optical spacer 700 are formed integrally.

Figure 7B:
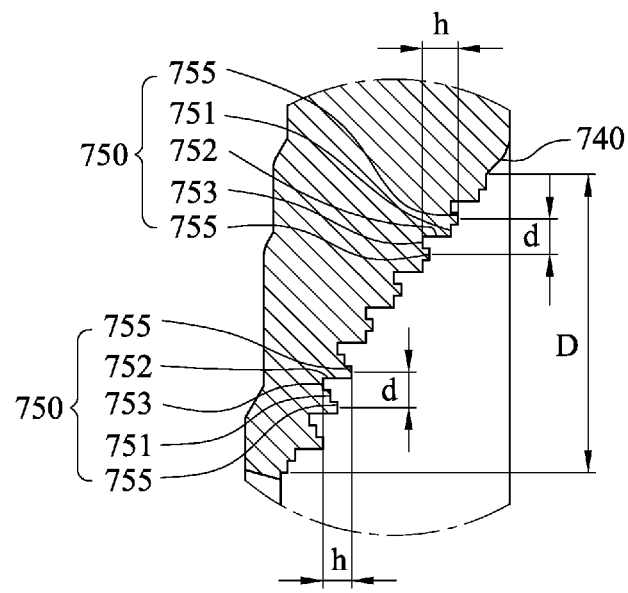
FIG. 7B is an enlarged view of part 7B in FIG. 7A which shows the parameters D, h and d according to the 7th embodiment.
Figure 7C:
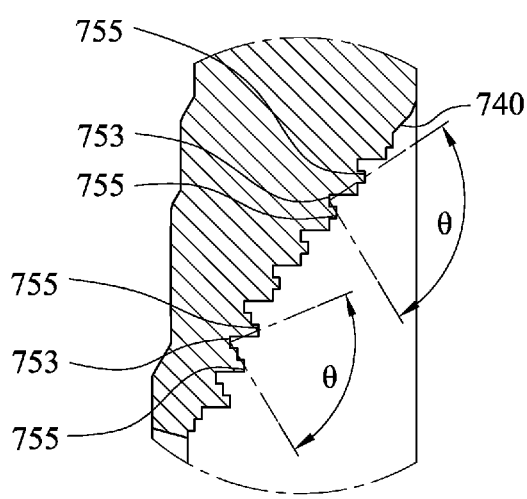
FIG. 7C shows a schematic view of the parameter θ according to the 7th embodiment.

FIG. 7B is an enlarged view of part 7B in FIG. 7A which shows the parameters D, h and d according to the 7th embodiment. FIG. 7C shows a schematic view of the parameter θ according to the 7th embodiment. In the 7th embodiment, the stepped surfaces of each of the annular grooves 750 include a plurality of orthogonal stepped surfaces 751 and a plurality of parallel stepped surfaces 752, wherein the orthogonal stepped surfaces 751 are orthogonal to the central axis and the parallel stepped surfaces 752 are parallel to the central axis. One of the orthogonal stepped surfaces 751 is a groove bottom 753, and each of another two of the orthogonal stepped surfaces 751 is a groove end 755. A distance parallel to the central axis between the groove bottom 753 and the first side portion 710 is smallest among distances parallel to the central axis between the orthogonal stepped surfaces 751 and the first side portion 710. The two groove ends 755 are disposed on two ends of the annular grooves 750 respectively.

The data of the parameters φ1, φ2, φ2/φ1, φ1−φ2, D, 2D/(φ1−φ2), ΣN2, N1, N2, h, d, h/d and θ of the annular optical spacer 700 according to the 7th embodiment of the present disclosure are listed in the following Table 7. The definitions of these parameters shown in Table 7 are the same as those stated in the 1st embodiment with corresponding values for the 7th embodiment. In Table 7, the sum of the orthogonal stepped surfaces 751 of each of the annular grooves 750 of the annular optical spacer 700 is ΣN2. Followed by showing the main ones of the annular grooves 750 of the annular optical spacer 700, a number of the annular grooves 750 which have the numbers of the orthogonal stepped surfaces 751 equaling to 4 to 14 respectively is N1, the number of the orthogonal stepped surfaces 751 of the annular grooves 750 aforementioned is N2, and the parameters h, d, h/d and θ corresponding to two kinds of the annular grooves 750 are respectively listed in Table 7 and shown as FIG. 7B and FIG. 7C.

TABLE 7

| 7th Embodiment | | | | |
|---|---|---|---|---|
| φ1(mm) | 5.10 | N1 | | 5 |
| φ2(mm) | 3.05 | N2 | 4 | 4 |
| φ2/φ1 | 0.60 | h (mm) | 0.060 | 0.075 |
| φ1−φ2 | 2.05 | d (mm) | 0.075 | 0.075 |
| D (mm) | 0.63 | h/d | 0.80 | 1.00 |
| 2D/(φ1−φ2) | 0.62 | θ (degrees) | 82.0 | 93.0 |
| ΣN2 | >10 | | | |

8th Embodiment

Figure 8A:
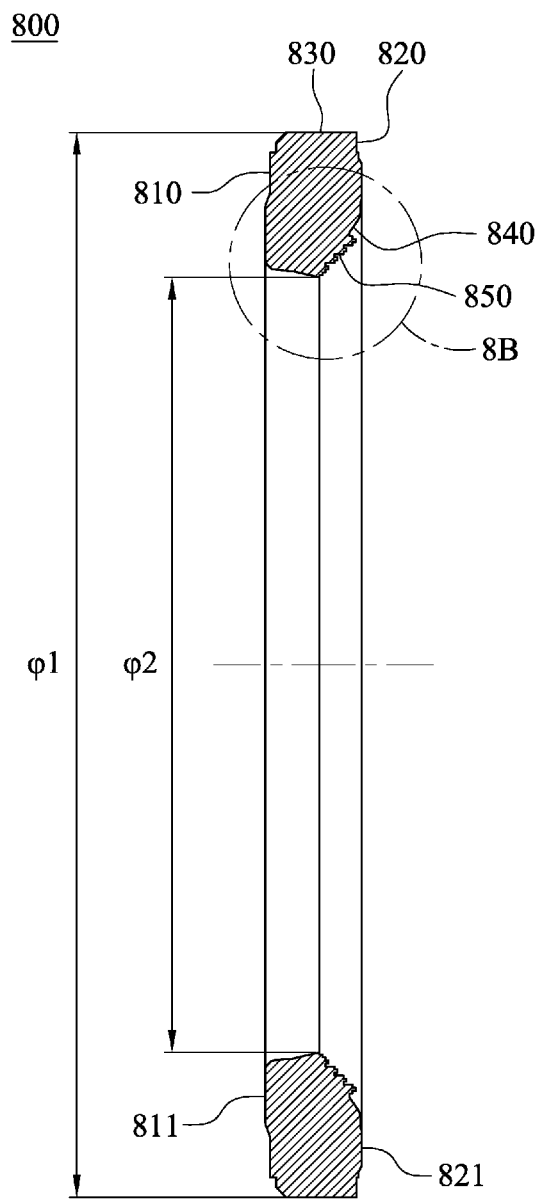
FIG. 8A is a schematic view of an annular optical spacer and the parameters φ1 and φ2 according to the 8th embodiment of the present disclosure.

FIG. 8A is a schematic view of an annular optical spacer 800 and the parameters φ1 and φ2 according to the 8th embodiment of the present disclosure. In the 8th embodiment, the annular optical spacer 800 includes a first side portion 810, a second side portion 820, an outer annular portion 830 and an inner annular portion 840.

The second side portion 820 is disposed opposite to the first side portion 810. The first side portion 810 and the second side portion 820 include an abutting surface 811 and an abutting surface 821 respectively, and the abutting surface 811, 821 are both flat and orthogonal to a central axis of the annular optical spacer 800. The outer annular portion 830 connects the first side portion 810 and the second side portion 820. The inner annular portion 840 connects the first side portion 810 and the second side portion 820, wherein the is inner annular portion 840 is closer to the central axis of the annular optical spacer 800 than the outer annular portion 830. The inner annular portion 840 includes a plurality of annular grooves 850, wherein the annular grooves 850 are disposed coaxially to the central axis, and each of the annular grooves 850 includes a plurality of stepped surfaces (its reference numeral is omitted).

The annular optical spacer 800 is made of black plastic material and manufactured by an injection molding method. The annular grooves 850 and the annular optical spacer 800 are formed integrally.

Figure 8B:
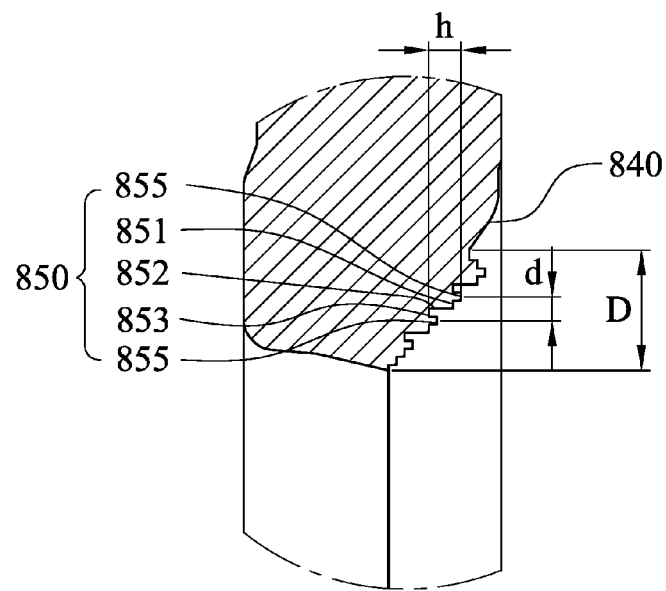
FIG. 8B is an enlarged view of part 8B in FIG. 8A which shows the parameters D, h and d according to the 8th embodiment.
Figure 8C:
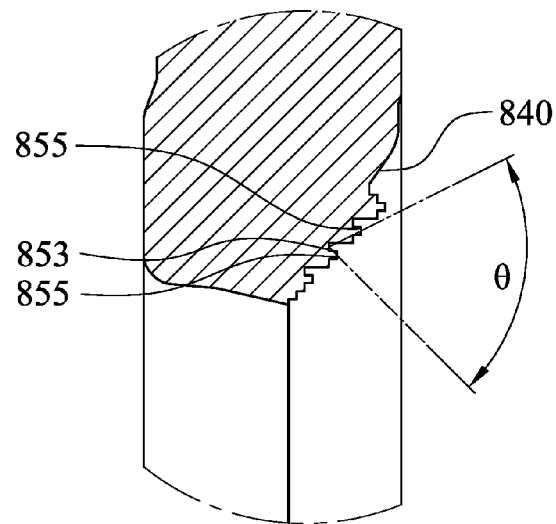
FIG. 8C shows a schematic view of the parameter θ according to the 8th embodiment.

FIG. 8B is an enlarged view of part 8B in FIG. 8A which shows the parameters D, h and d according to the 8th embodiment. FIG. 8C shows a schematic view of the parameter θ according to the 8th embodiment. In the 8th embodiment, the stepped surfaces of each of the annular grooves 850 include a plurality of orthogonal stepped surfaces 851 and a plurality of parallel stepped surfaces 852, wherein the orthogonal stepped surfaces 851 are orthogonal to the central axis and the parallel stepped surfaces 852 are parallel to the central axis. One of the orthogonal stepped surfaces 851 is a groove bottom 853, and each of another two of the orthogonal stepped surfaces 851 is to a groove end 855. A distance parallel to the central axis between the groove bottom 853 and the first side portion 810 is smallest among distances parallel to the central axis between the orthogonal stepped surfaces 851 and the first side portion 810. The two groove ends 855 are disposed on two ends of the annular grooves 850 respectively.

The data of the parameters φ1, φ2, φ2/φ1, φ1−φ2, D, 2D/(φ1−φ2), ΣN2, N1, N2, h, d, h/d and θ of the annular optical spacer 800 according to the 8th embodiment of the present disclosure are listed in the following Table 8. The definitions of these parameters shown in Table 8 are the same as those stated in the 1st embodiment with corresponding values for the 8th embodiment. In Table 8, the sum of the orthogonal stepped surfaces 851 of each of the annular grooves 850 of the annular optical spacer 800 is ΣN2. Followed by showing the main ones of the annular grooves 850 of the annular optical spacer 800, a number of the annular grooves 850 which have the numbers of the orthogonal stepped surfaces 851 equaling to 4 to 14 respectively is N1, the number of the orthogonal stepped surfaces 851 of the annular grooves 850 aforementioned is N2, and the parameters h, d, h/d and θ are listed in Table 8 and shown as FIG. 8B and FIG. 8C.

TABLE 8

| 8th Embodiment | | | |
|---|---|---|---|
| φ1(mm) | 5.30 | N1 | 3 |
| φ2(mm) | 3.86 | N2 | 4 |
| φ2/φ1 | 0.73 | h (mm) | 0.060 |
| φ1−φ2 | 1.44 | d (mm) | 0.045 |
| D (mm) | 0.22 | h/d | 1.33 |
| 2D/(φ1−φ2) | 0.31 | θ (degrees) | 72.0 |
| ΣN2 | >10 | | |

9th Embodiment

Figure 9A:
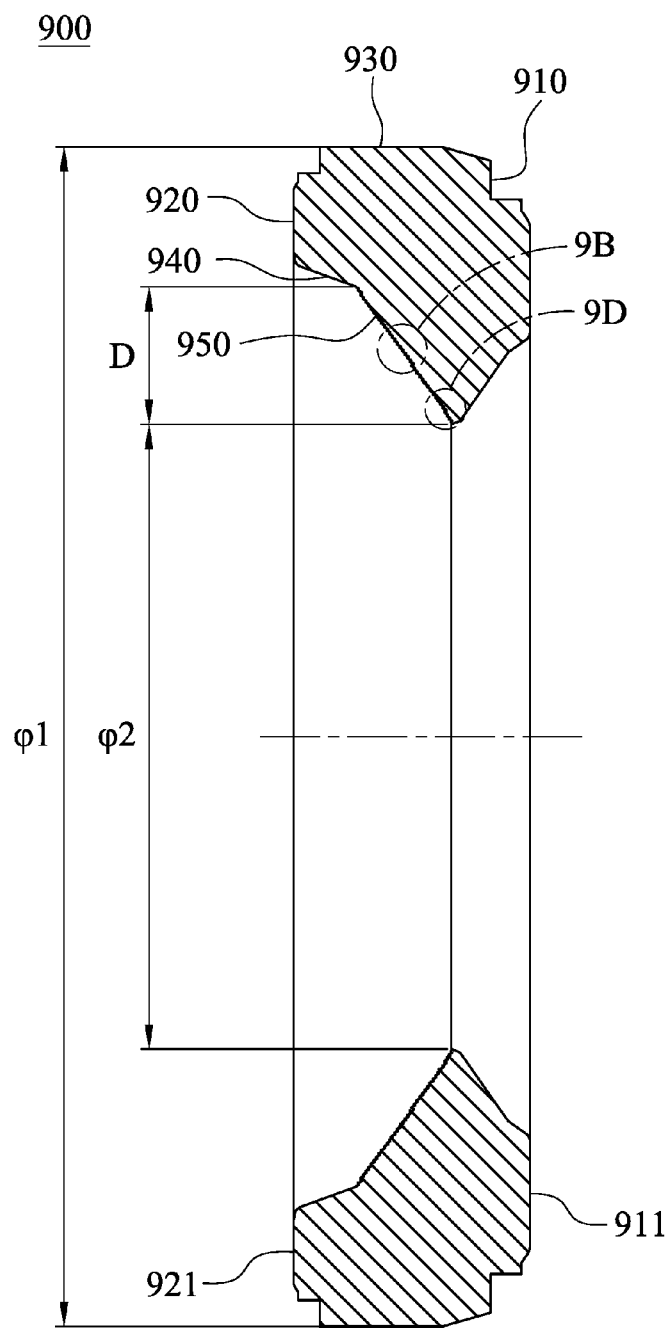
FIG. 9A is a schematic view of an annular optical spacer and the parameters φ1, φ2 and D according to the 9th embodiment of the present disclosure.

FIG. 9A is a schematic view of an annular optical spacer 900 and the parameters φ1, φ2 and D according to the 9th embodiment of the present disclosure. In the 9th embodiment, the annular optical spacer 900 includes a first side portion 910, a second side portion 920, an outer annular portion 930 and an inner annular portion 940.

The second side portion 920 is disposed opposite to the first side portion 910. The first side portion 910 and the second side portion 920 include an abutting surface 911 and an abutting surface 921 respectively, and the abutting surface 911, 921 are both flat and orthogonal to a central axis of the annular optical spacer 900. The outer annular portion 930 connects the first side portion 910 and the second side portion 920. The inner annular portion 940 connects the first side portion 910 and the second side portion 920, wherein the inner annular portion 940 is closer to the central axis of the annular optical spacer 900 than the outer annular portion 930. The inner annular portion 940 includes a plurality of annular grooves 950, wherein the annular grooves 950 are disposed coaxially to the central axis, and each of the annular grooves 950 includes a plurality of stepped surfaces (its reference numeral is omitted).

The annular optical spacer 900 is made of black plastic material and manufactured by an injection molding method. The annular grooves 950 and the annular optical spacer 900 are formed integrally.

Figure 9B:
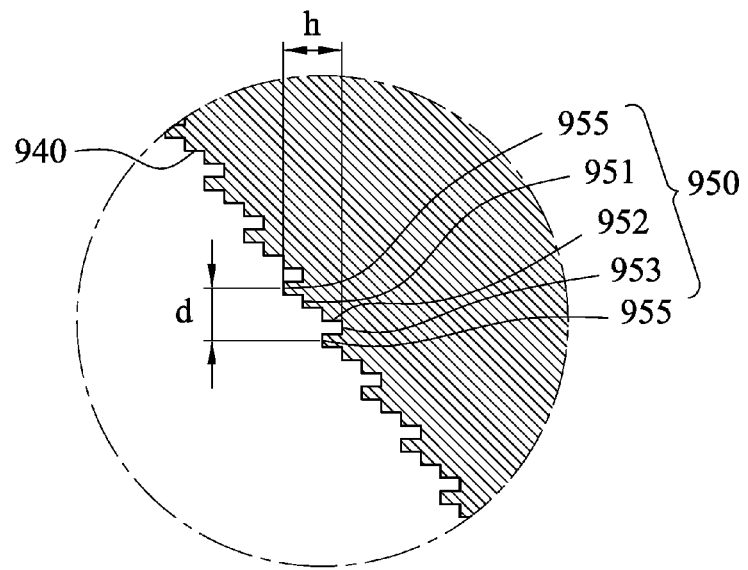
FIG. 9B is an enlarged view of part 9B in FIG. 9A which shows the parameters h and d according to the 9th embodiment.
Figure 9C:
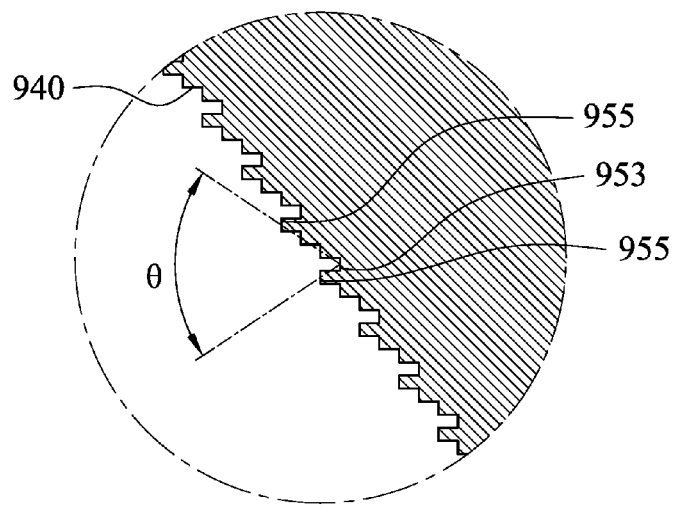
FIG. 9C shows a schematic view of the parameter θ according to the 9th embodiment.
Figure 9D:
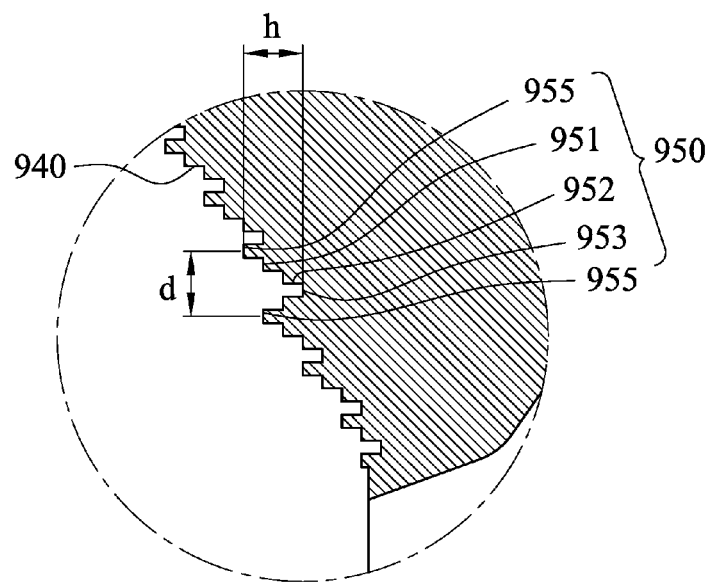
FIG. 9D is an enlarged view of part 9D in FIG. 9A which shows the parameters h and d according to the 9th embodiment.
Figure 9E:
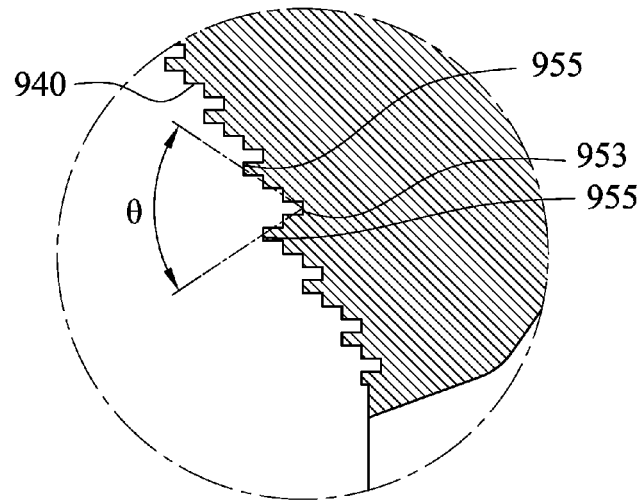
FIG. 9E shows another schematic view of the parameter θ according to the 9th embodiment.

FIG. 9B is an enlarged view of part 9B in FIG. 9A which shows the parameters h and d according to the 9th embodiment. FIG. 9C shows a schematic view of the parameter θ according to the 9th embodiment. FIG. 9D is an enlarged view of part 9D in FIG. 9A which shows the parameters h and d according to the 9th embodiment. FIG. 9E shows another schematic view of the parameter θ according to the 9th embodiment. In the 9th embodiment, FIG. 9B and FIG. 9C show one of the annular grooves 950 of the annular optical spacer 900, and FIG. 9D and FIG. 9E show another of the annular grooves 950 of the annular optical spacer 900. The stepped surfaces of each of the annular is grooves 950 include a plurality of orthogonal stepped surfaces 951 and a plurality of parallel stepped surfaces 952, wherein the orthogonal stepped surfaces 951 are orthogonal to the central axis and the parallel stepped surfaces 952 are parallel to the central axis. One of the orthogonal stepped surfaces 951 is a groove bottom 953, and each of another two of the orthogonal stepped surfaces 951 is a groove end 955. A distance parallel to the central axis between the groove bottom 953 and the first side portion 910 is smallest among distances parallel to the central axis between the orthogonal stepped surfaces 951 and the first side portion 910. The two groove ends 955 are disposed on two ends of the annular grooves 950 respectively.

The data of the parameters φ1, φ2, φ2/φ1, φ1−φ2, D, 2D/(φ1−φ2), ΣN2, N1, N2, h, d, h/d and θ of the annular optical spacer 900 according to the 9th embodiment of the present disclosure are listed in the following Table 9. The definitions of these parameters shown in Table 9 are the same as those stated in the 1st embodiment with corresponding values for the 9th embodiment. In Table 9, the sum of the orthogonal stepped surfaces 951 of each of the annular grooves 950 of the annular optical spacer 900 is ΣN2. Followed by showing the main ones of the annular grooves 950 of the annular optical spacer 900, a number of the annular grooves 950 which have the numbers of the orthogonal to stepped surfaces 951 equaling to 4 to 14 respectively is N1, the number of the orthogonal stepped surfaces 951 of the annular grooves 950 aforementioned is N2, the number of the annular grooves 950 (N1) which have the numbers of the orthogonal stepped surfaces 951 (N2) equaling to 5 respectively is 34, the number of the annular grooves 950 (N1) which have the numbers of the orthogonal stepped surfaces 951 (N2) equaling to 6 respectively is 2, and the corresponding parameters h, d, h/d and θ are listed in Table 9 and shown as FIG. 9B, FIG. 9C, FIG. 9D and FIG. 9E.

TABLE 9

9th Embodiment

| φ1(mm) | 13.50 | N1 | 36 | |
|---|---|---|---|---|
| φ2(mm) | 7.15 | N2 | 5 | 6 |
| φ2/φ1 | 0.53 | h (mm) | 0.045 | 0.045 |
| φ1−φ2 | 6.35 | d (mm) | 0.040 | 0.050 |
| D (mm) | 1.58 | h/d | 1.13 | 0.90 |
| 2D/(φ1−φ2) | 0.50 | θ (degrees) | 67.0 | 67.0 |
| ΣN2 | >40 | | | |

10th Embodiment

FIG. 10 shows an imaging lens module 1000 according to the 10th embodiment of the present disclosure. In the 10th embodiment, the imaging lens module 1000 includes a barrel 1100, a lens assembly 1200, and the annular optical spacer 100.

The lens assembly 1200 includes a plurality of lens elements (1210-1250) disposed in the barrel 1100.

In FIG. 10, FIG. 1D and FIG. 1E, the annular optical spacer 100 includes the first side portion 110, the second side portion 120, the outer annular portion 130 and the inner annular portion 140. The second side portion 120 is disposed opposite to the first side portion 110. The outer annular portion 130 connects the first side portion 110 and the second side portion 120. The inner annular portion 140 connects the first side portion 110 and the second side portion 120, wherein the inner annular portion 140 is closer to the central axis of the annular optical spacer 100 than the outer annular portion 130. The inner annular portion 140 includes the annular grooves 150, wherein the annular grooves 150 are disposed coaxially to the central axis, and each of the annular grooves 150 includes the stepped surfaces. Therefore, it is favorable for reducing the reflected lights effectively so as to improve the image quality. The other details of the annular optical spacer 100 have been described in the foregoing paragraphs and will not be repeated herein.

In details, the lens assembly 1200 includes the first lens element 1210, the second lens element 1220, the third lens element 1230, the fourth lens element 1240 and the fifth lens element 1250, wherein the fifth lens element 1250 is closest to an image plane of the imaging lens module 1000, and the fourth lens element 1240 is secondary closest to the image plane of the imaging lens module 1000. The annular optical spacer 100 is disposed between the fourth lens element 1240 and the fifth lens element 1250. The abutting surface 121 of the second side portion 120 abuts with a light limiting element (its reference numeral is omitted) next to the fifth lens element 1250. That is, the abutting surface 121 of the second side portion 120 abuts with the fifth lens element 1250 indirectly, and the abutting surface 111 of the first side portion 110 abuts with the fourth lens element 1240 directly. Therefore, it is favorable for stably maintaining an abutting strength so as to improve the image quality of the imaging lens module 1000.

Furthermore, in other embodiment, an imaging lens module can include at least two optical elements such as lens elements. The annular optical spacer can include two abutting surfaces respectively disposed on a first side portion and a second side portion, wherein the abutting surfaces are orthogonal to a central axis of the annular optical spacer and abut with one of the optical elements respectively.

Moreover, the imaging lens module can include at least two lens elements. One of the two abutting surfaces of the annular optical spacer abuts with one of the lens elements, which is closest to an image plane of the imaging lens module among lens elements. The other of the two abutting surfaces of the annular optical spacer abuts with another of the lens elements, which is secondary closest to the image plane of the imaging lens module among lens elements.

11th Embodiment

Figure 11:
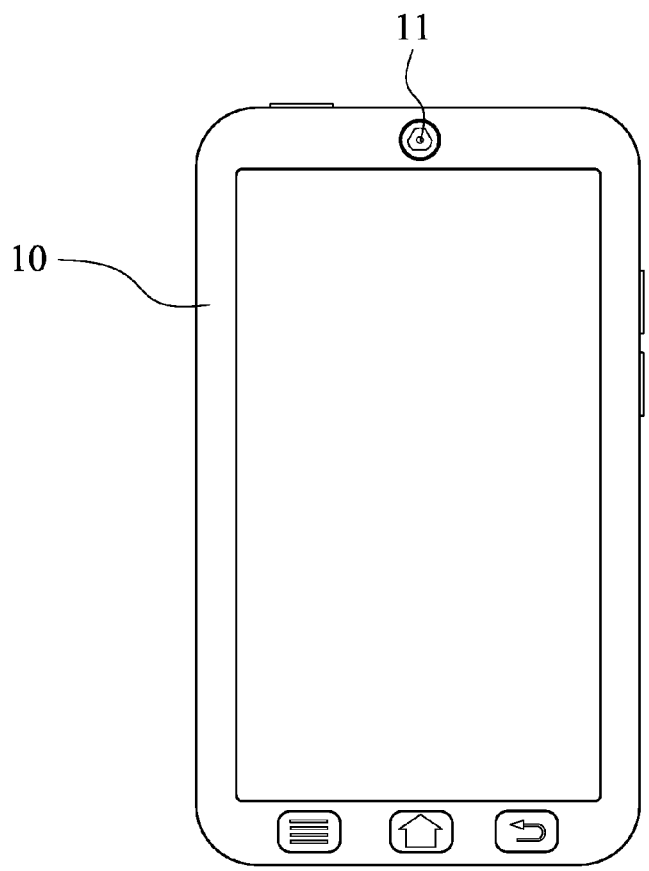
FIG. 11 shows an electronic device according to the 11th embodiment of the present disclosure.

FIG. 11 shows an electronic device 10 according to the 11th embodiment of the present disclosure. The electronic device 10 of the 11th embodiment is a smart phone, wherein the electronic device 10 includes an imaging apparatus 11, the imaging apparatus 11 includes an imaging lens module (not shown) according to the present disclosure and an image sensor (not shown), and the imaging lens module includes an annular optical spacer (not shown) according to the present disclosure. Therefore, it is favorable for reducing the reflected lights effectively so as to improve the image quality and satisfy the requirements of high-end electronic devices with camera functionalities. Furthermore, the image sensor is disposed on or near an image surface of the imaging lens module. Preferably, the electronic device 10 can further include but not limited to a display, a control unit, a storage unit, a random access memory unit (RAM), a read-only memory unit (ROM) or a combination thereof.

12th Embodiment

Figure 12:
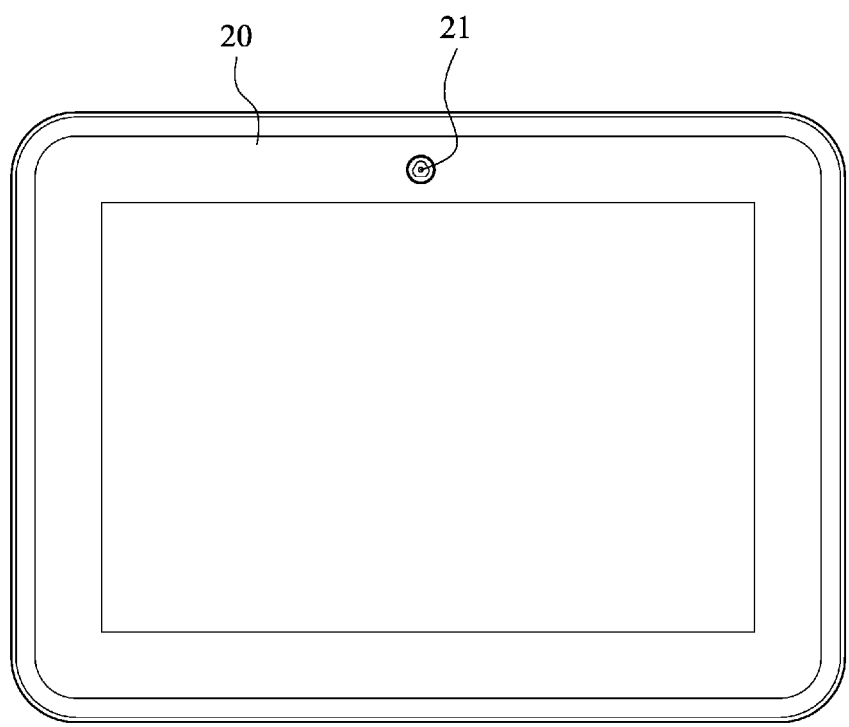
FIG. 12 shows an electronic device according to the 12th embodiment of the present disclosure.

FIG. 12 shows an electronic device 20 according to the 12th embodiment of the present disclosure. The electronic device 20 of the 12th embodiment is a tablet personal computer, wherein the electronic device 20 includes an imaging apparatus 21, the imaging apparatus 21 includes an imaging lens module (not shown) according to the present disclosure and an image sensor (not shown), the imaging lens module includes an annular optical spacer (not shown) according to the present disclosure, and the image sensor is disposed on or near an image surface of the imaging lens module.

13th Embodiment

Figure 13:
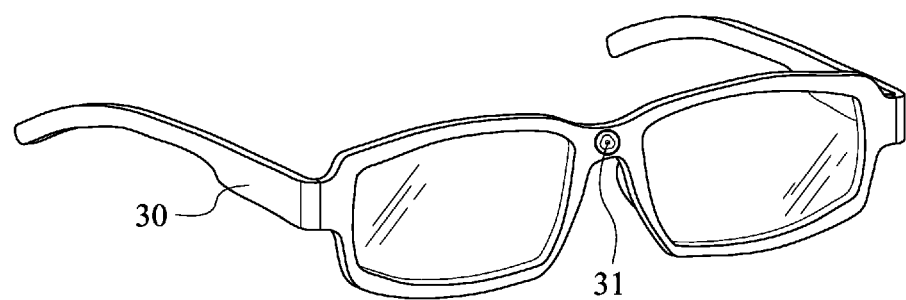
FIG. 13 shows an electronic device according to the 13th embodiment of the present disclosure.

FIG. 13 shows an electronic device 30 according to the 13th embodiment of the present disclosure. The electronic device 30 of the 13th embodiment is a head-mounted display, wherein the electronic device 30 includes an imaging apparatus 31, the imaging apparatus 31 includes an imaging lens module (not shown) according to the present disclosure and an image sensor (not shown), the imaging lens module includes an annular optical spacer (not shown) according to the present disclosure, and the image sensor is disposed on or near an image surface of the imaging lens module.

Although the present disclosure has been described in considerable detail with reference to the embodiment thereof, other embodiments are possible. Therefore, the spirit and scope of the appended claims should not be limited to the description of the embodiment contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:
1. An annular optical spacer, comprising:
a first side portion;
a second side portion disposed opposite to the first side portion;
an outer annular portion connecting the first side portion and the second side portion; and
an inner annular portion connecting the first side portion and the second side portion, wherein the inner annular portion is closer to a central axis of the annular optical spacer than the outer annular portion is to the central axis, and comprises:
a plurality of annular grooves, wherein the annular grooves are disposed coaxially to the central axis, and each of the annular grooves comprises a plurality of stepped surfaces;
wherein the stepped surfaces of each of the annular grooves comprise a plurality of orthogonal stepped surfaces orthogonal to the central axis, one of the orthogonal stepped surfaces is a groove bottom, and each of another two of the orthogonal stepped surfaces is a groove end;
wherein a distance parallel to the central axis between the groove bottom and the first side portion is smallest among distances parallel to the central axis between the orthogonal stepped surfaces and the first side portion, the two groove ends are disposed on two ends of the annular grooves respectively, and a distance parallel to the central axis between each of the two groove ends and the first side portion is greater than distances parallel to the central axis between the orthogonal stepped surfaces adjacent to thereof and the first side portion;
wherein the distance parallel to the central axis between one of the two groove ends and the first side portion is greater than the distance parallel to the central axis between the other one of the two groove ends and the first side portion, a distance parallel to the central axis between the one of the two groove ends and the groove bottom is h, and the following condition is satisfied:

$$0.02 \text{ mm} < h < 0.15 \text{ mm}.$$

2. The annular optical spacer of claim 1, wherein the annular grooves and the annular optical spacer are formed integrally.

3. The annular optical spacer of claim 2, wherein each of the first side portion and the second side portion comprises an abutting surface, and each of the abutting surfaces is flat and orthogonal to the central axis of the annular optical spacer.

4. The annular optical spacer of claim 3, wherein an outer diameter of the annular optical spacer is φ1, an inner diameter of the annular optical spacer is φ2, and the following condition is satisfied:

$$0.40 < \varphi 2/\varphi 1 < 0.90.$$

5. The annular optical spacer of claim 3, wherein a distance between an end closest to the central axis and an end farthest away from the central axis of the annular grooves is D, an outer diameter of the annular optical spacer is φ1, an inner diameter of the annular optical spacer is φ2, and the following condition is satisfied:

$$0.15 < 2D/(\varphi 1 - \varphi 2) < 0.80.$$

6. The annular optical spacer of claim 2, wherein the annular optical spacer is made of black plastic material and manufactured by an injection molding method.

7. The annular optical spacer of claim 1, wherein a number of the annular grooves is N1, and the following condition is satisfied:

$$2 \leq N1 \leq 50.$$

8. The annular optical spacer of claim 7, wherein the number of the annular grooves is N1, and the following condition is satisfied:

$$2 \leq N1 \leq 10.$$

9. An imaging lens module, comprising:
a barrel;
a lens assembly, which comprises a plurality of lens elements disposed in the barrel; and
an annular optical spacer, which is disposed in the barrel and connects to at least one of the lens elements, wherein the annular optical spacer comprises:
a first side portion;
a second side portion disposed opposite to the first side portion;

an outer annular portion connecting the first side portion and the second side portion; and an inner annular portion connecting the first side portion and the second side portion, wherein the inner annular portion is closer to a central axis of the annular optical spacer than the outer annular portion is to the central axis, and comprises:

a plurality of annular grooves, wherein the annular grooves are disposed coaxially to the central axis, and each of the annular grooves comprises a plurality of stepped surfaces;

wherein the stepped surfaces of each of the annular grooves comprise a plurality of orthogonal stepped surfaces orthogonal to the central axis, one of the orthogonal stepped surfaces is a groove bottom, and each of another two of the orthogonal stepped surfaces is a groove end;

wherein a distance parallel to the central axis between the groove bottom and the first side portion is smallest among distances parallel to the central axis between the orthogonal stepped surfaces and the first side portion, the two groove ends are disposed on two ends of the annular grooves respectively, and a distance parallel to the central axis between each of the two groove ends and the first side portion is greater than distances parallel to the central axis between the orthogonal stepped surfaces adjacent to thereof and the first side portion;

wherein the distance parallel to the central axis between one of the two groove ends and the first side portion is greater than the distance parallel to the central axis between the other one of the two groove ends and the first side portion, a distance parallel to the central axis between the one of the two groove ends and the groove bottom is h, a distance orthogonal to the central axis between the two groove ends is d, and the following condition is satisfied:

$0.15 < h/d < 1.6$.

10. The imaging lens module of claim 9, wherein a number of the annular grooves is N1, and the following condition is satisfied:

$2 \leq N1 \leq 10$.

11. An imaging apparatus, comprising:
the imaging lens module of claim 9.
12. An electronic device, comprising:
the imaging apparatus of claim 11.
13. An imaging lens module, comprising:
a barrel;
a lens assembly, which comprises a plurality of lens elements disposed in the barrel; and an annular optical spacer, which is disposed in the barrel and connects to at least one of the lens elements, wherein the annular optical spacer comprises:

a first side portion;

a second side portion disposed opposite to the first side portion;

an outer annular portion connecting the first side portion and the second side portion; and an inner annular portion connecting the first side portion and the second side portion, wherein the inner annular portion is closer to a central axis of the annular optical spacer than the outer annular portion is to the central axis, and comprises:

a plurality of annular grooves, wherein the annular grooves are disposed coaxially to the central axis, and each of the annular grooves comprises a plurality of stepped surfaces;

wherein the stepped surfaces of each of the annular grooves comprise a plurality of orthogonal stepped surfaces orthogonal to the central axis, one of the orthogonal stepped surfaces is a groove bottom, and each of another two of the orthogonal stepped surfaces is a groove end;

wherein a distance parallel to the central axis between the groove bottom and the first side portion is smallest among distances parallel to the central axis between the orthogonal stepped surfaces and the first side portion, the two groove ends are disposed on two ends of the annular grooves respectively, and a distance parallel to the central axis between each of the two groove ends and the first side portion is greater than distances parallel to the central axis between the orthogonal stepped surfaces adjacent to thereof and the first side portion;

wherein an angle between two lines connecting the groove bottom and the two groove ends respectively is θ, and the following condition is satisfied:

45 degrees < θ < 125 degrees.

14. The imaging lens module of claim 13, wherein a number of the annular grooves is N1, and the following condition is satisfied:

$2 \leq N1 \leq 10$.

15. An imaging apparatus, comprising:
the imaging lens module of claim 13.
16. An electronic device, comprising:
the imaging apparatus of claim 15.

* * * * *